United States Patent
Iwasaki

(10) Patent No.: US 7,114,047 B2
(45) Date of Patent: Sep. 26, 2006

(54) DATA STORAGE MEDIUM WITH CERTIFICATION DATA

(75) Inventor: Hiroshi Iwasaki, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 135 days.

(21) Appl. No.: 10/669,420

(22) Filed: Sep. 25, 2003

(65) Prior Publication Data

US 2004/0059884 A1    Mar. 25, 2004

Related U.S. Application Data

(62) Division of application No. 09/457,524, filed on Dec. 9, 1999, now Pat. No. 6,651,149.

(30) Foreign Application Priority Data

Dec. 10, 1998  (JP)  .................................. 10-351650
Mar. 11, 1999  (JP)  .................................. 11-064165

(51) Int. Cl.
*G06F 12/00*    (2006.01)
(52) U.S. Cl. ................... 711/163; 361/684; 361/735; 361/737; 380/44; 365/201; 365/189.01; 235/382; 705/73
(58) Field of Classification Search ................ 711/101, 711/153, 156, 163, 164, 170; 365/189.01, 365/201; 361/684, 737, 735; 235/492, 482, 235/78; 705/73, 404; 713/185, 192, 193, 713/194; 710/12, 301; 380/44; 701/3
See application file for complete search history.

(56) References Cited

U.S. PATENT DOCUMENTS

| | | | |
|---|---|---|---|
| 4,593,384 A * | 6/1986 | Kleijne | 365/228 |
| 4,746,788 A * | 5/1988 | Kawana | 235/380 |
| 4,802,218 A * | 1/1989 | Wright et al. | 705/60 |
| 4,809,326 A | 2/1989 | Shigenaga | 705/73 |
| 4,960,982 A * | 10/1990 | Takahira | 235/382 |
| 5,109,152 A * | 4/1992 | Takagi et al. | 235/380 |
| 5,168,151 A | 12/1992 | Nara | 235/492 |
| 5,379,344 A * | 1/1995 | Larsson et al. | 380/251 |
| 5,550,709 A | 8/1996 | Iwasaki | 361/684 |
| 5,563,945 A | 10/1996 | Gercekci | 713/190 |
| 5,672,182 A * | 9/1997 | Smith | 44/349 |
| 5,737,582 A | 4/1998 | Fukuzumi | 710/301 |
| 5,794,222 A | 8/1998 | Wakabayashi et al. | 705/404 |
| 5,796,839 A | 8/1998 | Ishiguro | 380/44 |
| 6,073,062 A | 6/2000 | Hoshino et al. | 701/3 |
| 6,126,070 A * | 10/2000 | Fukuzumi | 235/380 |

(Continued)

FOREIGN PATENT DOCUMENTS

DE    0214478 A2 *    3/1987

(Continued)

*Primary Examiner*—Christian P. Chace
(74) *Attorney, Agent, or Firm*—Oblon, Spivak, McClelland, Maier & Neustadt, P.C.

(57) ABSTRACT

A data storage medium has a first memory area that is read-only and stores first certification data that is unique to the data storage medium, a second memory area that stores data and second certification data supplied from the outside, an identity circuit for determining whether or not the first and second certification data are identical with each other, and a switch circuit for providing the data stored in the second memory area to the outside only when the identity circuit determines that the first and second certification data are identical with each other. If data is written into the data storage medium with illegal certification data, the data storage medium disables the reading of the written data from the data storage medium, thereby preventing the illegal copying of digital data.

31 Claims, 31 Drawing Sheets

U.S. PATENT DOCUMENTS

| | | |
|---|---|---|
| 6,298,388 B1 | 10/2001 | Taguchi ................. 710/12 |
| 6,669,487 B1 * | 12/2003 | Nishizawa et al. ........... 439/60 |
| 2004/0185685 A1 * | 9/2004 | Nishizawa et al. ........... 439/66 |

FOREIGN PATENT DOCUMENTS

| | | |
|---|---|---|
| JP | 0228278 A2 * | 7/1987 |
| JP | 62-189164 | 12/1987 |
| JP | 63-61393 | 3/1988 |
| JP | 0406610 A2 * | 1/1991 |
| JP | 6-259248 | 9/1994 |
| JP | 6-274711 | 9/1994 |
| JP | 6-69419 | 3/1995 |
| JP | 9-55468 | 2/1997 |
| JP | 10-302030 | 11/1998 |

* cited by examiner

FIG. 16

| | |
|---|---|
| BLOCK 0 (CIS AREA) | :16KB |
| BLOCK 1 | :16KB |
| BLOCK 2 | :16KB |
| | |
| BLOCK 2047 | :16KB |

| | |
|---|---|
| HIDDEN BLOCK | :16KB |

FIG. 17

| | |
|---|---|
| PAGE 0 | :528 BYTE |
| PAGE 1 | :528 BYTE |
| PAGE 2 | :528 BYTE |
| | |
| PAGE 31 | :528 BYTE |

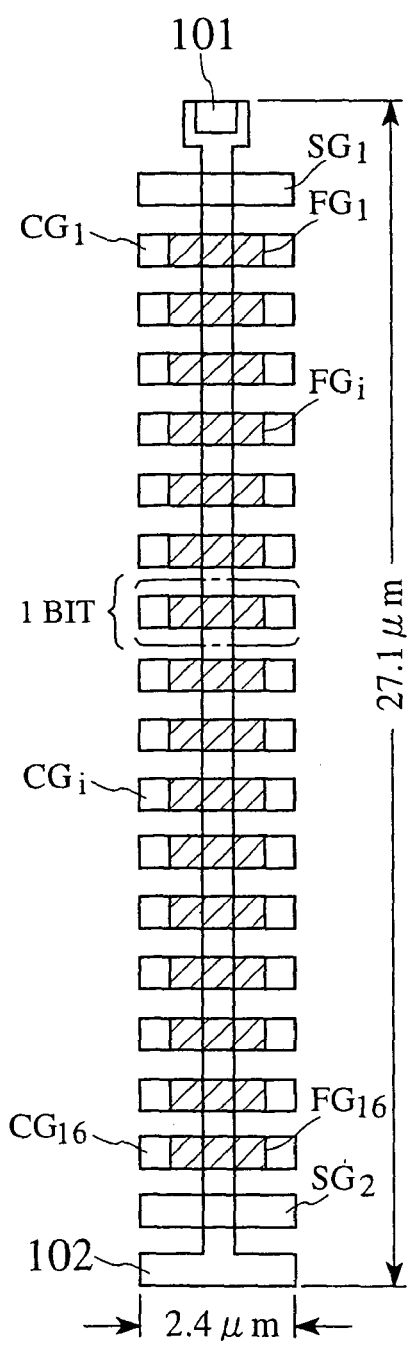
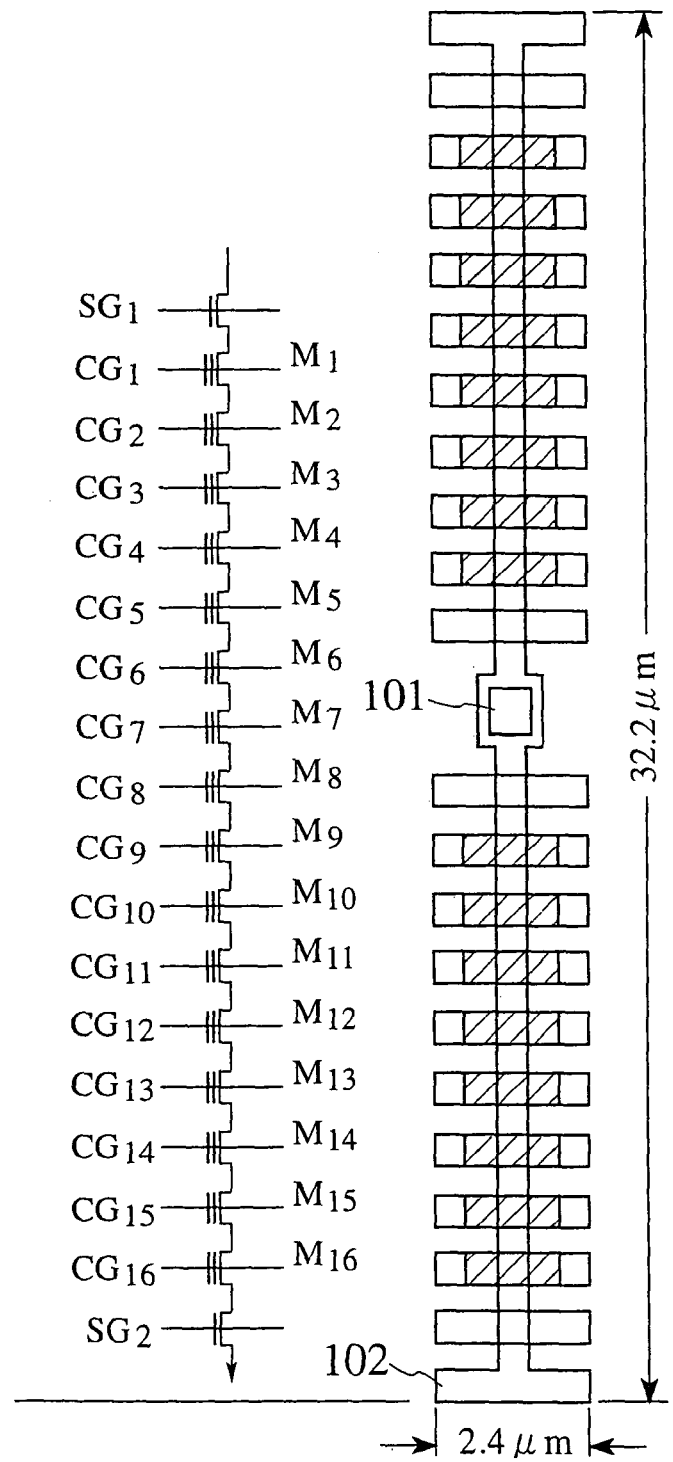
CG : CONTROL GATE  SG : SELECT GATE  M : MEMORY CELL
FIG. 34A    FIG. 34B    FIG. 34C

DATA STORAGE MEDIUM WITH CERTIFICATION DATA

CROSS REFERENCE TO A RELATED APPLICATION

This application is a Divisional application of Ser. No. 09/457,524, filed on Dec. 9, 1999 now U.S. Pat. No. 6,651,149.

BACKGROUND OF THE INVENTION

1. Field of the Invention

The present invention relates to data storage media for storing digital data, and particularly, to data storage media having certification data.

2. Description of the Related Art

Various types of information in characters, images, video, and audio are presently handled as digital data. To record digital data and programs, a variety of storage media such as tapes, floppy disks, hard disks, and magneto-optical disks are used.

The floppy disks are one of popular media. When data are written or read, the floppy disks need to be rotated. Therefore, the disk-drives must have a motor and a rotating mechanism. Due to this, the floppy disks are improper for electronic devices that must be small and light.

Portable electronic devices need external data storage media that are small and light and ensure compatibility among various types of electronic devices.

Data storage media that meet these requirements are those having nonvolatile semiconductor memories which are electrically rewritable. For example, card-type data storage media incorporating nonvolatile semiconductor memories are suitable for the portable electronic devices. Many techniques have been developed to record contents such as still images, voice, and music in the card-type data storage media.

Unlike analog data, digital data never deteriorates even if it is repeatedly copied among data storage media. It is required, therefore, to provide a technique of preventing the illegal copying of digital contents.

In particular, electronic commerce and electronic banking must prevent the illegal alteration and copying of data, in particular, personal identification data stored in data storage media.

SUMMARY OF THE INVENTION

A first object of the present invention is to provide data storage media, data recorders, and data readers capable of preventing the illegal copying of digital data.

A second object of the present invention is to provide data storage media that secure the safety of certification data stored therein from alteration.

In order to accomplish the objects, an aspect of the present invention provides a data storage medium having a first semiconductor memory area that is read-only and stores first certification data that is unique to the data storage medium, a second semiconductor memory area that stores data and second certification data supplied from the outside, an identity circuit for determining whether or not the first and second certification data are identical with each other, and a switch circuit for providing the data stored in the second semiconductor memory area to the outside only when the identity circuit determines that the first and second certification data are identical with each other.

When an external device records data in the data storage medium of this aspect, the data storage medium passes the first certification data to the external device. Then, the external device records data and the first certification data in the data storage medium. The first certification data recorded at this time is used as second certification data. By testing to see if the first and second certification data are identical with each other, an illegal alteration of certification data can be checked. If an illegal alteration of certification data is detected, no data is provided from the data storage medium to the outside, thereby preventing illegal data copying.

The identity circuit may be configured to determine whether or not the second certification data is identical with third certification data, which is generated from the first certification data.

Another aspect of the present invention provides a data storage medium having a semiconductor element. The semiconductor element has a first memory area, a second memory area, first wiring for controlling data write and erase operations of the first memory area, a first terminal for controlling the first wiring, second wiring for controlling a data write operation of the second memory area, and a second terminal for controlling the second wiring. The data storage medium further has an external terminal connected to the second terminal and electrically separated from the first terminal, and a support material for supporting the semiconductor element and external terminal so that the semiconductor element is covered with the support material and the external terminal is exposed from the support material. The first memory area stores certification data that identifies the semiconductor element.

According to this aspect, the first wiring for controlling the write and erase operations of the first memory area is controlled through the first terminal, which is electrically separated from the external terminal, so that the certification data stored in the first memory area will never be altered through the external terminal. This arrangement is simple to protect the certification data stored in the first memory area from an illegal alteration.

Still another aspect of the present invention provides a method of manufacturing a data storage medium. The method includes the step of forming semiconductor elements on a semiconductor substrate. Each of the semiconductor elements has a first memory area, a second memory area, first wiring for controlling data write and erase operations of the first memory area, second wiring for controlling a data write operation of the second memory area, a first terminal for controlling the first wiring, and a second terminal for controlling the second wiring. The method further includes the steps of writing unique certification data in the first memory area of each of the semiconductor elements, cutting the semiconductor substrate to separate the semiconductor elements from one another into semiconductor chips, arranging each of the semiconductor chips on a wiring board having an external terminal, and connecting, for each of the semiconductor chips, the second terminal to the external terminal and sealing each of the semiconductor chips so that the first terminal is electrically isolated.

This method writes unique certification data into the first memory area of each semiconductor element during manufacturing. Thereafter, the method seals the first terminal for controlling the first wiring that controls the write and erase operations of the first memory area, so that the first terminal is isolated from the external terminal. This method is simple to make the first memory area unalterable, thereby protecting the certification data stored in the first memory area from illegal manipulation.

Still another aspect of the present invention provides a data recorder for recording data in a data storage medium having a semiconductor memory that stores certification data unique to the data storage medium. The data recorder has a data processing unit. The data processing unit has a memory for storing a first code that is unique to the data processing unit, a unit for acquiring the certification data from the data storage medium, a unit for generating a second code based on the first code and the certification data, a unit for encoding the data based on the second code, and a unit for writing the encoded data into the data storage medium.

According to this aspect, each data storage medium is provided with unique certification data, and the data processing unit of the data recorder has a unique first code. The certification data and first code are used to generate a second code. The second code is used to encode data, and the encoded data is recorded in the data storage medium. To decode and reproduce the data recorded by the data recorder, the second code must be used. Namely, the certification data of the data storage medium and the first code unique to the data processing unit of the data recorder are imperative to recover meaningful data from the data storage medium. In other words, the meaningful data will never be collected from any data storage medium that does not have the certification data, or with any data reader that does not have the first code. This prevents illegal data copying.

The memory or data processing unit for storing the first code may be a second data storage medium attached to the data recorder.

Still another aspect of the present invention provides a data reader for reading data from a data storage medium having a semiconductor memory that stores certification data unique to the data storage medium. The data reader has a data processing unit. The data processing unit has a memory for storing a first code unique to the data processing unit, a unit for acquiring the certification data from the data storage medium, a unit for generating a second code based on the first code and certification data, a unit for reading the data from the data storage media, and a unit for decoding the read data based on the second code.

This data reader is capable of reading data that has been recorded in a data storage medium by the recorder mentioned above. The data reader acquires unique certification data from the data storage medium, generates a second code based on the certification data and first code, and uses the second code to read data as meaningful informations from the data storage medium.

The memory or data processing unit for storing the first code may be a second data storage medium attached to the data reader.

Still another aspect of the present invention provides a data storage medium removably attached to a data recorder that records data in a second data storage medium having a semiconductor memory that stores certification data unique to the second data storage medium. The data storage medium has a memory for storing a first code that is unique to the data storage medium, a unit for acquiring the certification data from the second data storage medium, a unit for generating a second code based on the first code and acquired certification data, a unit for receiving data from the data recorder, a unit for encoding the received data based on the second code, and a unit for writing the encoded data into the second data storage medium. The data storage medium may have CPU.

Still another aspect of the present invention provides a data storage medium removably attached to a data reader that reads data from a second data storage medium having a semiconductor memory that stores certification data unique to the second data storage medium. The data storage medium has a memory for storing a first code that is unique to the data storage medium, a unit for acquiring the certification data from the second data storage medium, a unit for generating a second code based on the first code and acquired certification data, a unit for reading the data from the second data storage medium, and a unit for decoding the read data based on the second code.

The data storage medium mentioned above is attached to a data recorder or a data reader, to serve as a data processing unit of the data recorder or reader. Since the data storage medium is removable from the data recorder or reader, the data recorder or reader may commonly be used for many data storage media. The first code stored in the data storage medium may be data related to a specific person, and this person may keep the data storage medium to secure the safety of the data.

BRIEF DESCRIPTION OF THE DRAWINGS

FIG. 16 shows a memory area of a smart medium;

FIG. 17 shows a hidden block in the memory area of the smart medium;

FIGS. 34A to 34C show plan views of NAND-type memory cells and an equivalent circuit;

DETAILED DESCRIPTION OF THE EMBODIMENTS

Data storage media, data recorders, and data readers according to these embodiments will be explained.

The data storage media according to these embodiments may be IC cards. The IC cards are roughly classified into those with CPUs and those without CPUs. The IC cards with CPUs and memories are called "smart cards," and the IC cards having memories without CPUs are called "memory cards."

Figure 1:
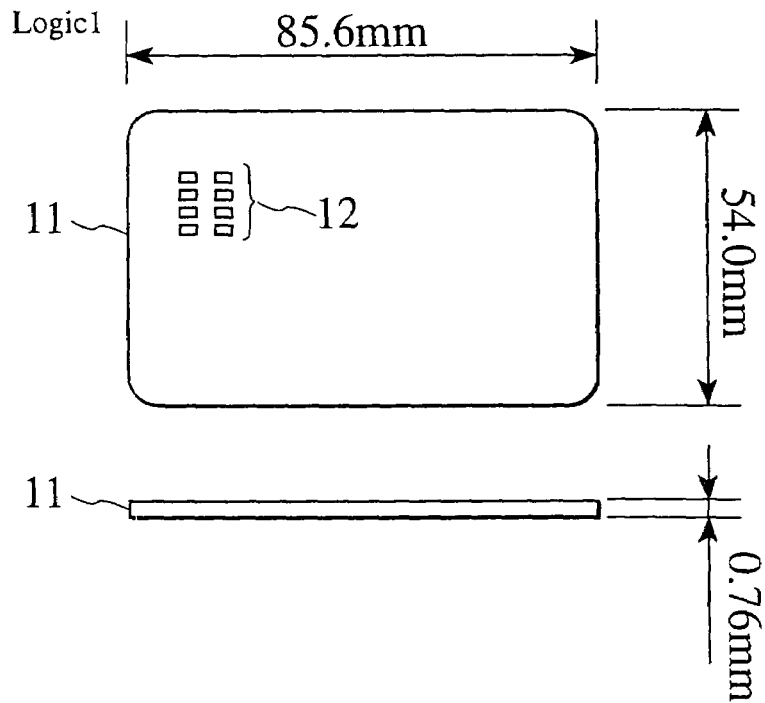
FIG. 1 shows a smart card serving as a data storage medium.

FIG. 1 is a plan view showing a smart card 11. The smart card 11 has a length of 85.6 mm, a width of 54.0 mm, and a thickness of 0.76±0.08 mm according to ISO (International Organization for Standardization) 7810. A flat terminal 12 is exposed on a surface of the smart card 11. The terminal 12 is used to access an IC in the smart card 11. The shape of the terminal 12 is based on the ISO 7816.

Figure 2:
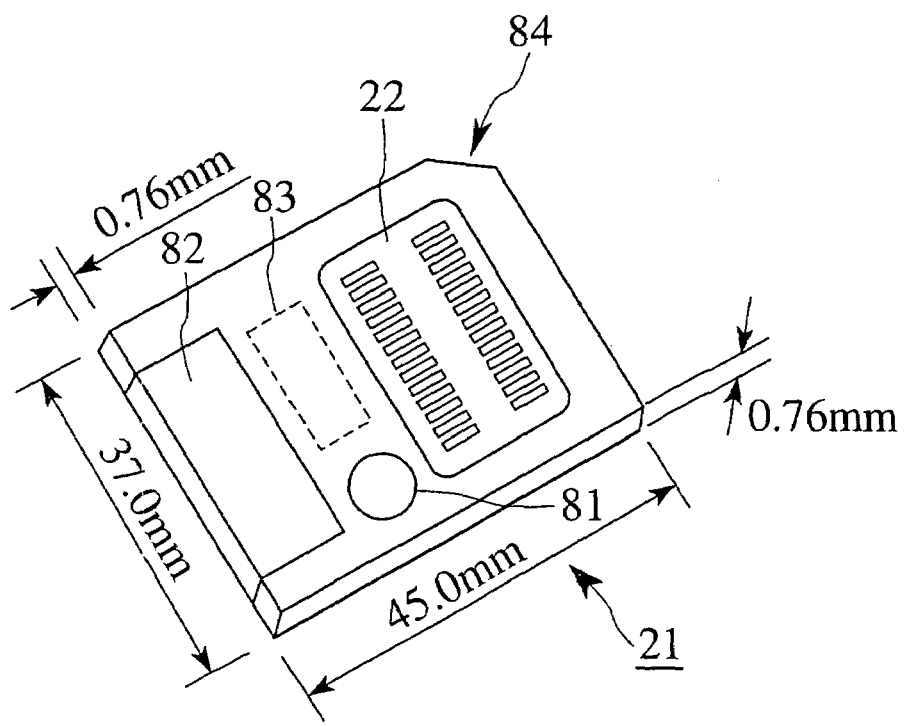
FIG. 2 shows a memory card serving as a data storage medium.

FIG. 2 shows a memory card 21. The memory card 21 has a length of 45.0±0.1 mm, a width of 37.0±0.1 mm, and a thickness of 0.76±0.08 mm and is based on MO-186 (floppy disk card) of JEDEC. An external terminal 22 is exposed on a surface of the memory card 21. The shape and number of pins of the terminal 22 differ from those of the terminal 12 of the smart card 11. The terminal 22 is used to access the inside of the memory card 21.

The smart card 11 and memory card 21 have each a semiconductor memory. The memory capacity of the smart card 11 is small in the range of 0.5 to 32 KB. This capacity is insufficient for storing identification data such as a photograph, signature, and fingerprint. On the other hand, the storage capacity of the memory card 21 is in the range of 128 M Bytes although it is less than half the smart card 11 in size. Accordingly, the memory card 21 is suitable for storing still images, sound, music, and ID data.

In this way, the smart cards and memory cards serve differently. These cards may be used together to achieve a variety of processes on data stored therein.

Figure 3:
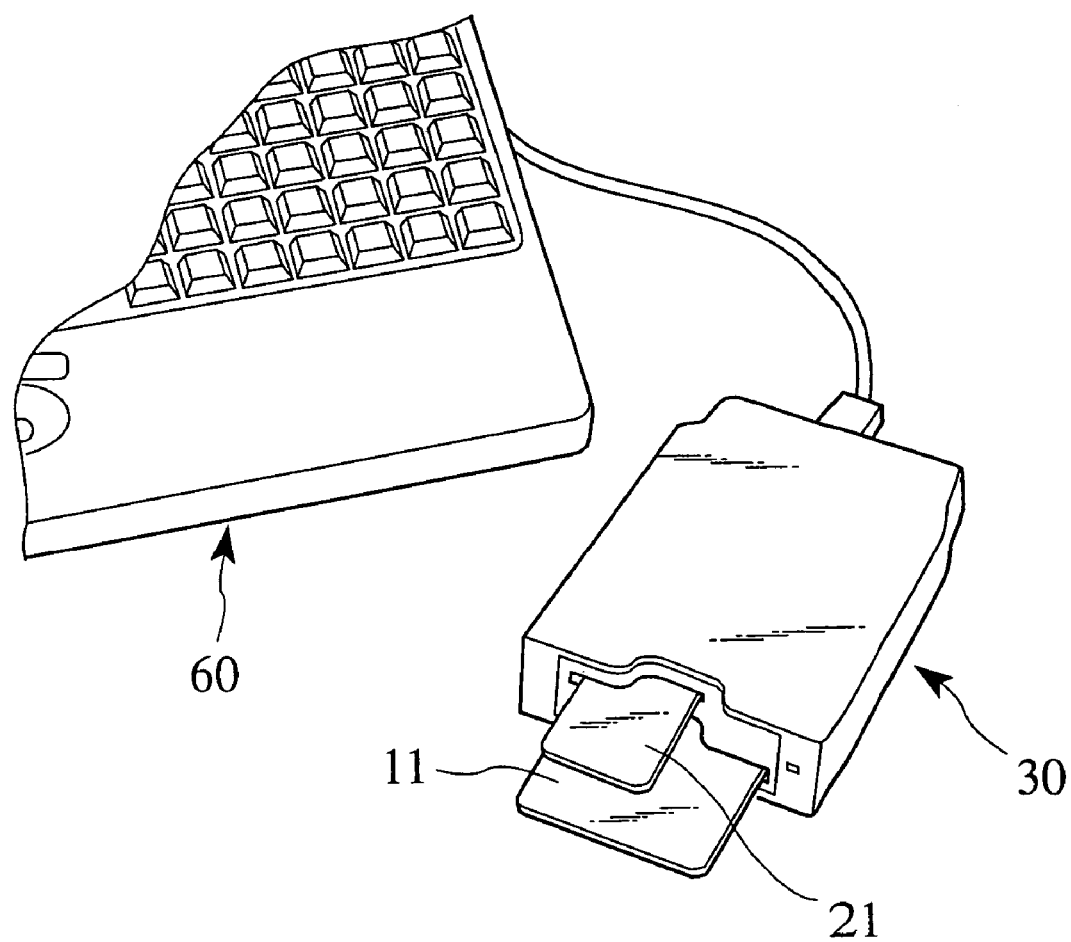
FIG. 3 shows a data recorder-reader system.

FIG. 3 is a perspective view showing a data recorder-reader 30 that incorporates a data recorder and data reader according to any one of the first to third embodiments of the present invention. The data recorder-reader 30 records data in an IC card and reads data out of an IC card.

An external apparatus such as a personal computer 60 is used to enter data into the recorder-reader 30, which records the data in an IC card. Data recorded in an IC card is read by the recorder-reader 30, which transfers the read data to the personal computer 60.

Figure 4:
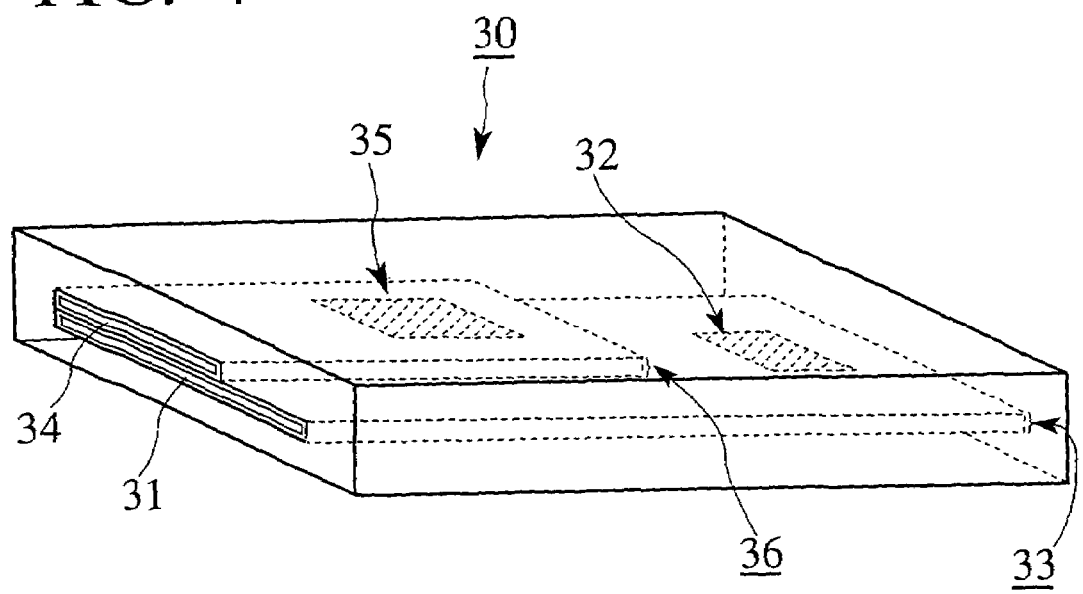
FIG. 4 shows an example of a data recorder-reader.
Figure 5:
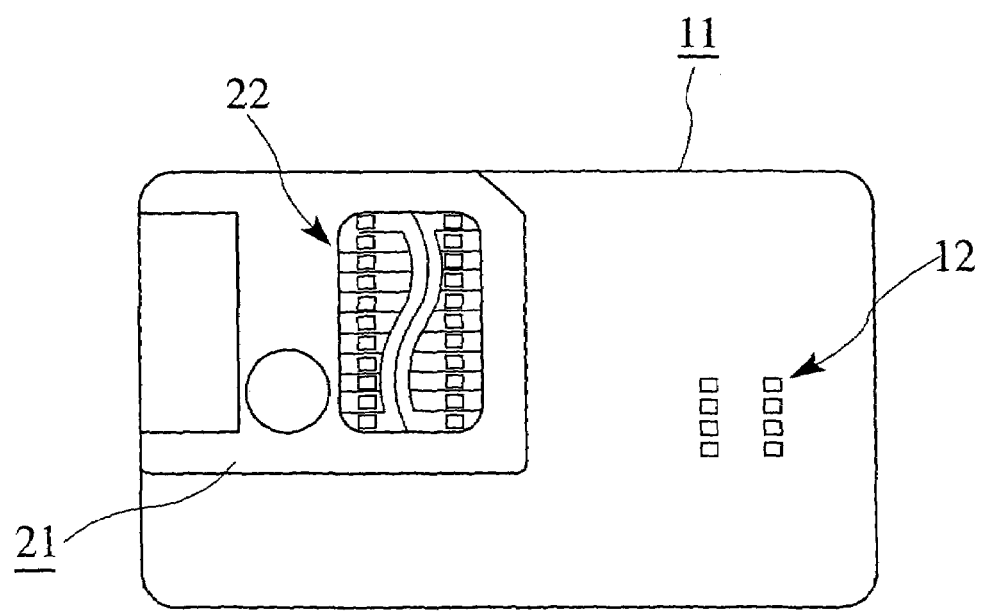
FIG. 5 is a plan view showing a positional relationship between a smart card and a memory card in the device of FIG. 4.

FIG. 4 shows an example of the structure of the data recorder-reader 30. The recorder-reader 30 has a slot 31 for receiving a smart card 11 and a slot 34 for receiving a memory card 21. FIG. 5 shows the smart card 11 and memory card 21 inserted into the slots 31 and 34, respectively.

Figure 6A:
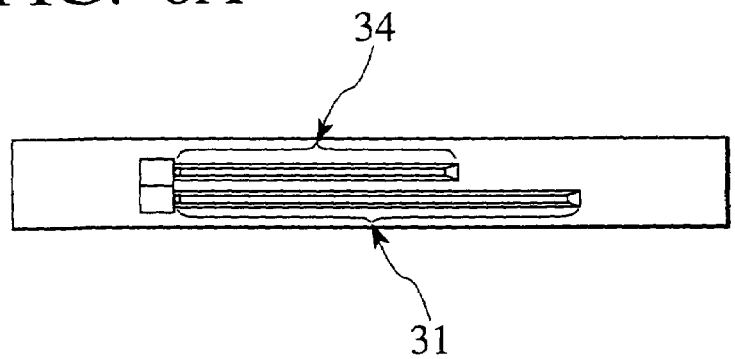
FIG. 6A is a front view showing slots of the device of FIG. 4.

The slot 31 has a card holder 33 and the slot 34 has a card holder 36. The card holder 33 has an inner wall on which a contact electrode 32 is formed, and the card holder 36 has an inner wall on which a contact electrode 35 is formed. FIG. 6A is a front view showing the slots 31 and 34, and FIG. 6B is a sectional view showing the recorder-reader 30.

Figure 6B:
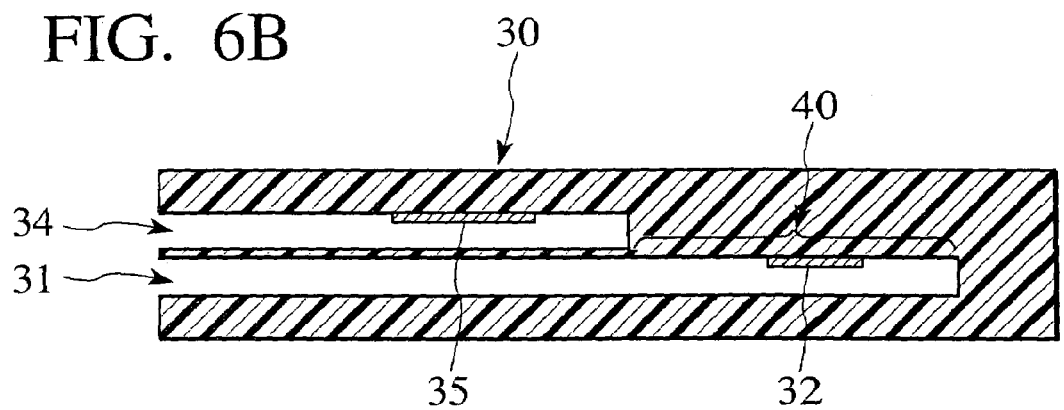
FIG. 6B is a sectional view showing the device of FIG. 4.
Figure 8:
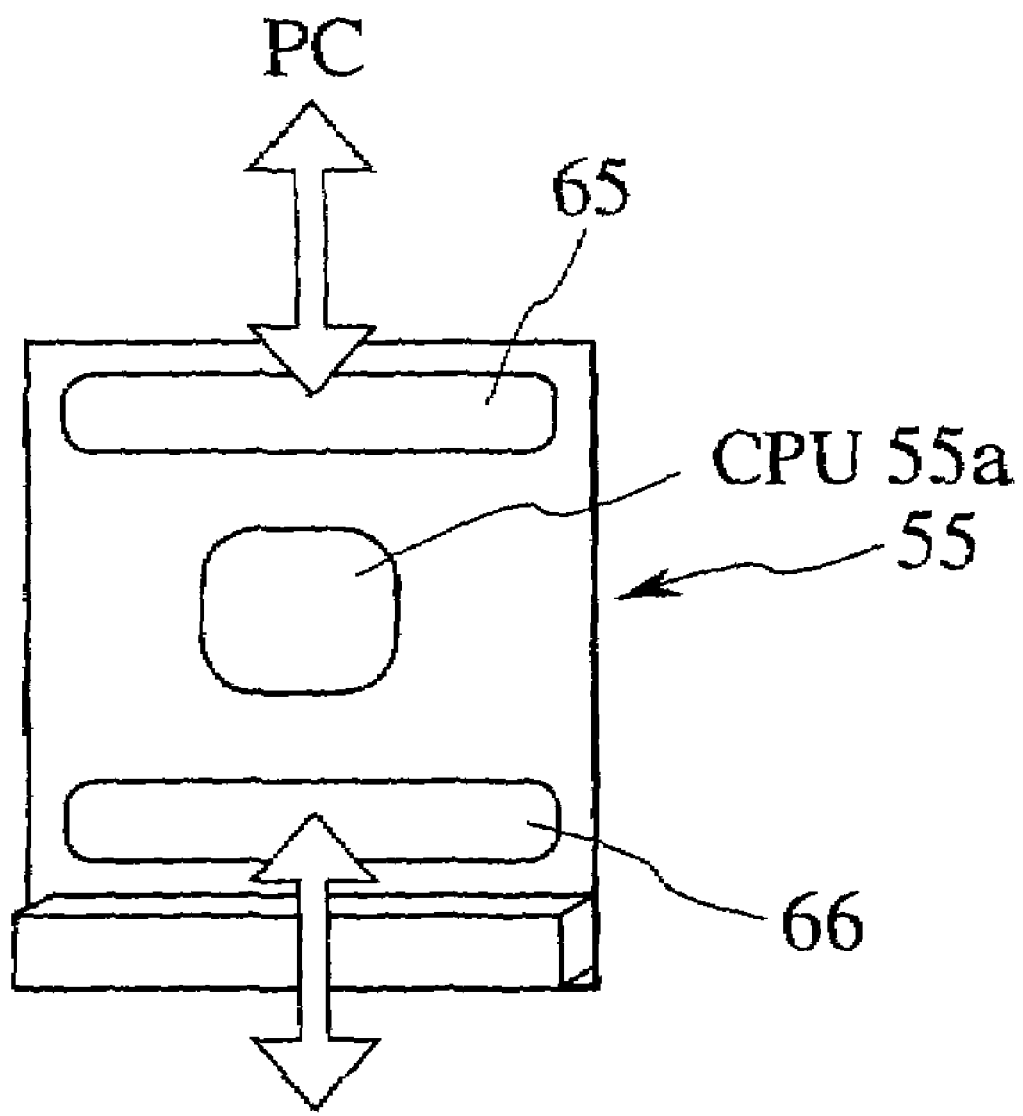
FIG. 8 shows an interface arranged between the device of FIG. 4 and a personal computer.

In FIG. 6B, the contact electrodes 32 and 35 are positioned not to overlap each other. There is an area 40 where the slots 31 and 34 do not overlap each other and where an interface 55 of FIG. 8 including a controller for driving the smart card 11 and memory card 21 is arranged.

Figure 7:
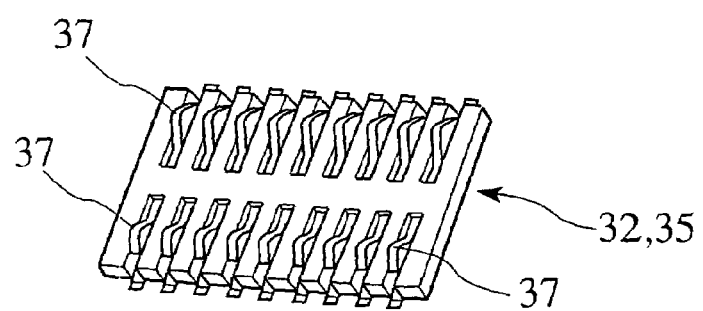
FIG. 7 shows a connector of the device of FIG. 4 connected to a memory card.

FIG. 7 shows contact spring pins 37 provided for each of the contact electrodes 32 and 35. When the smart card 11 and memory card 21 are inserted into the slots 31 and 34, respectively, an external terminal 12 of the smart card 11 is electrically connected to the contact electrode 32, and an external terminal 22 of the memory card 21 is electrically connected to the contact electrode 35. Although the recorder-reader 30 handles two types of data storage media, i.e., the smart card and memory card in this example, it may handle only one type of data storage media.

First Embodiment

Data storage media according to the first embodiment of the present invention will be explained. The first embodiment stores unique certification data in a data storage medium, to prevent the illegal copying of digital data.

Unique certification data stored in a data storage medium is used as a part of a key to encode or decode data when recording or reading the data to or from the data storage medium. It may be used as a key to encode an encode key or a decode key. Unique certification data provided for an individual data storage medium prevents the illegal copying of data recorded in the data storage medium and secures the safety of data record and read operations on the data storage medium.

Figure 9:
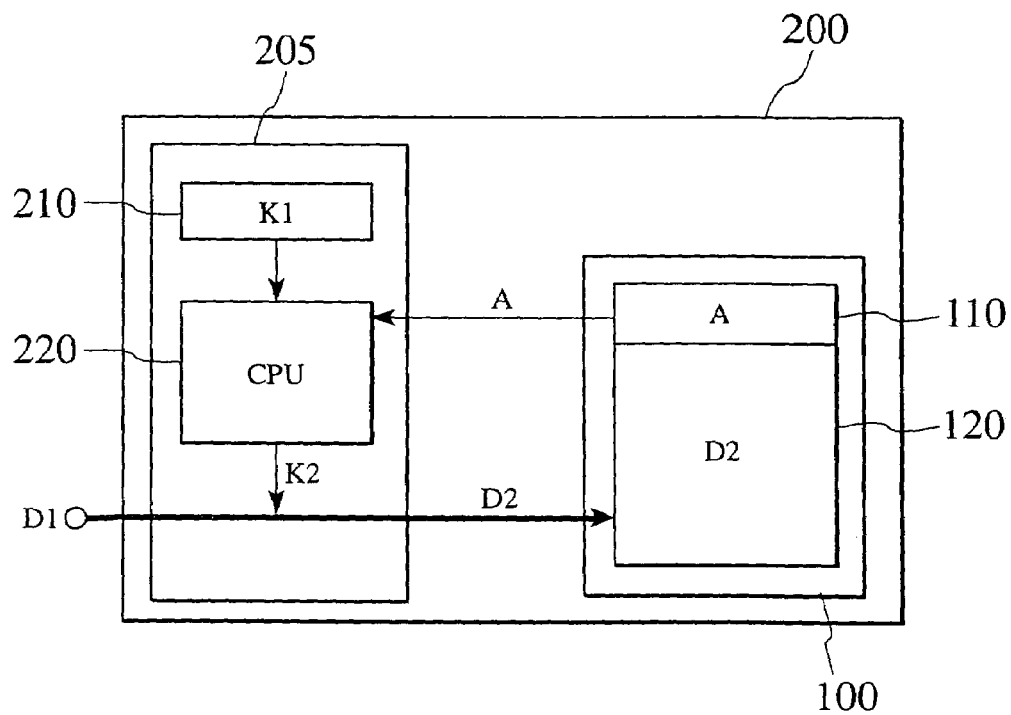
FIG. 9 shows a data recorder and data storage medium according to a first embodiment of the present invention.

FIG. 9 shows a data storage medium 100, a data recorder 200, and a flow of data D1 supplied from the outside and recorded in the data storage medium 100, according to the first embodiment of the present invention.

The data recorder 200 may be the data recorder-reader 30 of FIGS. 3 and 4. The data storage medium 100 is an IC card, which may be the smart card 11 or the memory card 21 of FIG. 5.

The data recorder 200 has a data processing unit 205. The data processing unit 205 may be the smart card 11 having a CPU inserted into the data recorder 200.

In FIG. 9, the data storage medium 100 has a first memory area 110, which is read-only, i.e., not rewritable or erasable and stores certification data A, and a second memory area 120 that is rewritable. The data processing unit 205 has a nonvolatile memory 210 for storing a special code serving as a first encode key K1 and a CPU 220.

The CPU 220 acquires the certification data A from the first memory area 110 of the data storage medium 100, reads the first encode key K1 from the nonvolatile memory 210, and generates a second encode key K2 based on the certification data A and first encode key K1. The second encode key K2 is used to encode the received data D1 into data D2. The encoded data D2 is stored in the second memory area 120 of the data storage medium 100.

Figure 10:
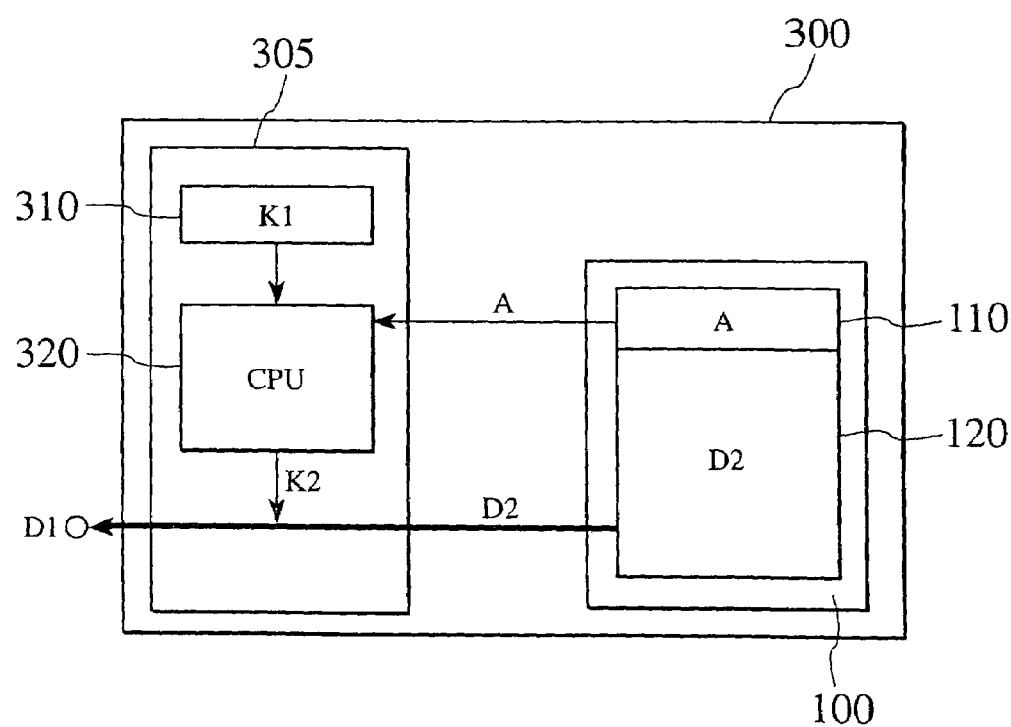
FIG. 10 shows a data reader and data storage medium according to the first embodiment.

FIG. 10 shows a data storage medium 100, a data reader 300, and a flow of data D2 read from the data storage medium 100 and decoded into data D1, according to the first embodiment of the present invention.

The data reader 300 may be the data recorder-reader of FIGS. 3 and 4. The data reader 300 has a data processing unit 305. The data processing unit 305 may be the smart card 11 of FIG. 5 having a CPU inserted into the data reader 300.

In FIG. 10, the data storage medium 100 has a first memory area 110, which is read-only, i.e., not rewritable or erasable and stores certification data A, and a second memory area 120 that is rewritable. The data processing unit 305 has a nonvolatile memory 310 for storing a unique encode key K1 and a CPU 320.

The CPU 320 acquires the certification data A from the first memory area 110 of the data storage medium 100, reads the first encode key K1 from the nonvolatile memory 310, and generates a second encode key K2 based on the certification data A and first encode key K1. According to the second encode key K2, the CPU 320 decodes the encoded data D2 stored in the second memory area 120 of the data storage medium 100 into data D1 and provides the decoded data D1 to the outside. The data reader 300 may have a D/A converter to convert the decoded data D1 into analog data and provide the analog data to the outside.

The certification data A stored in the data storage medium 100 corresponds to a public key, and the first encode key K1 stored in the data processing unit 205 (305) corresponds to a secret key. If the data D2 stored in the data storage medium 100 that has the certification data A in the first memory area 110 is illegally copied into another data storage medium having unique certification data B, the data processing unit 305 of the data reader 300 that reads the other storage medium is unable to create the second decode key K2 to decode the data D2. Consequently, the data reader 300 is unable to provide the data D1 out of the second storage medium, and therefore, the illegally copied data in the second storage medium is useless.

The data D1 supplied from the outside is, for example, music data. To record contents such as music in the data storage medium 100, the certification data A kept in the data storage medium 100 and the first encode key K1 unique to the data processing unit 205 of the data recorder 200 are used to encode the data D1 into data D2, and the encoded data D2 is recorded in the data storage medium 100. The encoded data D2 is effective informations only when it is recorded in the data storage medium that has the certification data A used to encode the data D1 into the data D2.

Even if the data in the data storage medium 100 is illegally copied to other data storage medium whose certification data differs from that of the data storage medium 100, the data in the other storage medium will never correctly be read because of the different certification data serving as a public key. Consequently, the music data in the other storage medium is useless.

The first encode key K1 of FIGS. 9 and 10 may be identification data for the data recorder 200 and data reader 300. This means that the data D2 has a one-to-one relationship with respect to the data storage medium 100 having the certification data A.

The data recorder 200 (reader 300) may accept two IC cards, one serving as the data storage medium 100 and the other as the data processing unit 205 (305). The other card may accept as a nonvolatile memory 210 (310) for keeping the key K1. In this case, an authorized user may keep the first encode key K1 serving as a secret key, and a single data recorder or reader may commonly be used for many data storage media.

The first encode key K1 may be personal identification data recorded in a smart card. For example, in a network distribution service for music, a smart card containing music data and a personal secret key is given to a user in exchange for payment for the music data. This personal secret key may be used as the first encode key K1.

In this way, the first embodiment is capable of providing an information system of high security that allows only authorized users, for example, who made correct payments to use copyrighted data.

Second Embodiment

The data recorder and data reader of the first embodiment of FIGS. 9 and 10 have simplified structures to realize high security. However, unlike optical media such as optical disks, the data storage medium 100 of FIGS. 9 and 10 employing semiconductor elements must have physical electrical connections such as connectors between the data storage medium 100 and a data recorder or a data reader. Such connections have a risk of being tampered with an illegal access path between the data storage medium 100 and the data recorder or reader.

Figure 11:
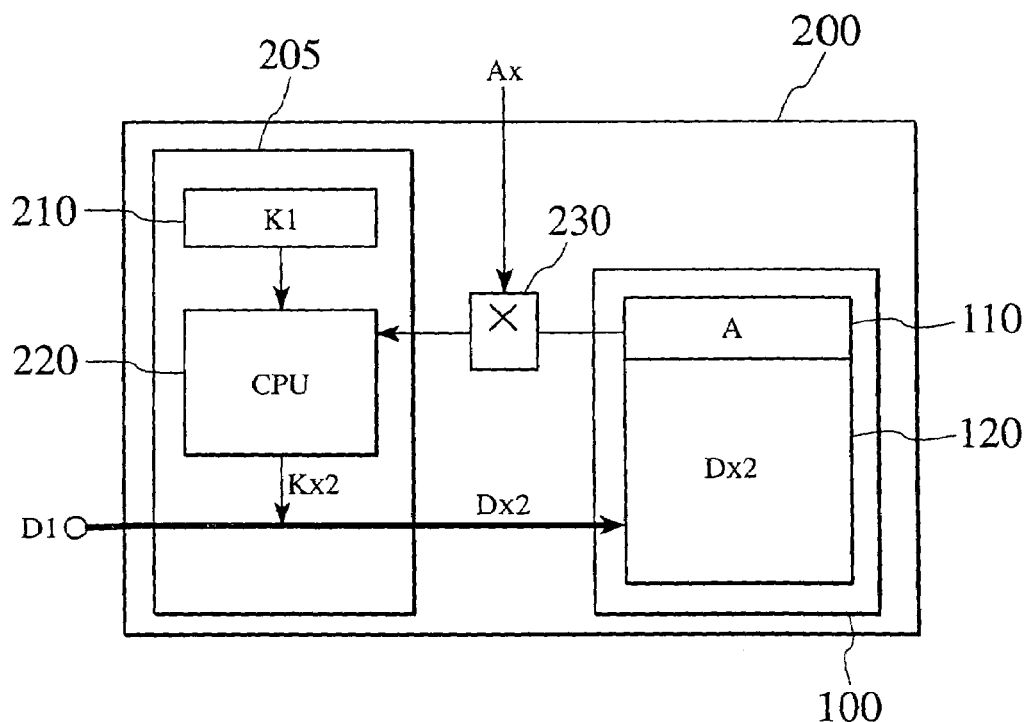
FIG. 11 shows illegal data recording on the data recorder of the first embodiment.
Figure 12:
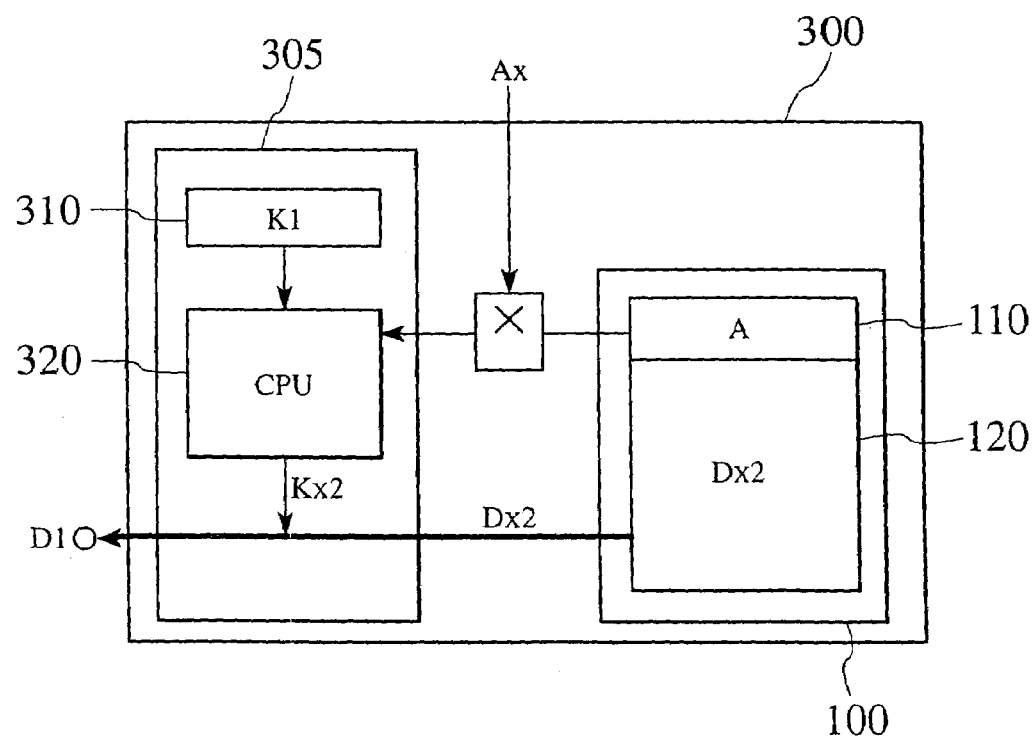
FIG. 12 shows illegal data reading on the data reader of the first embodiment.

FIGS. 11 and 12 show examples of such illegal access paths. In FIG. 11, an illegal access path X is inserted between a data storage medium 100 and a data processing unit 205 of a data recorder 200, to supply false certification data Ax from the outside. In response to the false certification data Ax, a CPU 220 of the data processing unit 205 erroneously acknowledges that the certification data Ax is one that is unique to the data storage medium 100. According to the false certification data Ax and a first encode key K1 stored in a nonvolatile memory 210, the data processing unit 205 creates a second encode key Kx2, which is not an originally intended encode key.

Digital data D1 supplied to the data processing unit 205 is encoded based on the false second encode key Kx2 into data Dx2, which is recorded in a second memory area 120 of the data storage medium 100.

The data Dx2 illegally recorded in any data storage medium can illegally be read therefrom according to a technique shown in FIG. 12. In a data reader 300, an illegal access path X is inserted between the data storage medium 100 and a data processing unit 305 of the data reader 300. Through the illegal access path X, the false certification data Ax is supplied. The false certification data Ax and a first encode key K1 stored in the data processing unit 305 are used to create a false second encode key Kx2, which is identical with the false second encode key Kx2 used when recording the data Dx2 into the data storage medium 100. As a result, the data Dx2 is decoded based on the key Kx2 into the meaningful digital data D1.

Even if each data storage medium is provided with proper unique certification data, the technique mentioned above makes all data storage media pretend to have the same certification data Ax. This results in enabling the data Dx2 to be infinitely copied in data storage media and enabling data readers to decode the copied data Dx2 into meaningful data. The data storage media and devices of the first embodiment are vulnerable to this kind of illegal access or copying.

The second embodiment provides data storage media, data recorders, and data readers that are capable of preventing the above-mentioned illegal actions.

Figure 13:
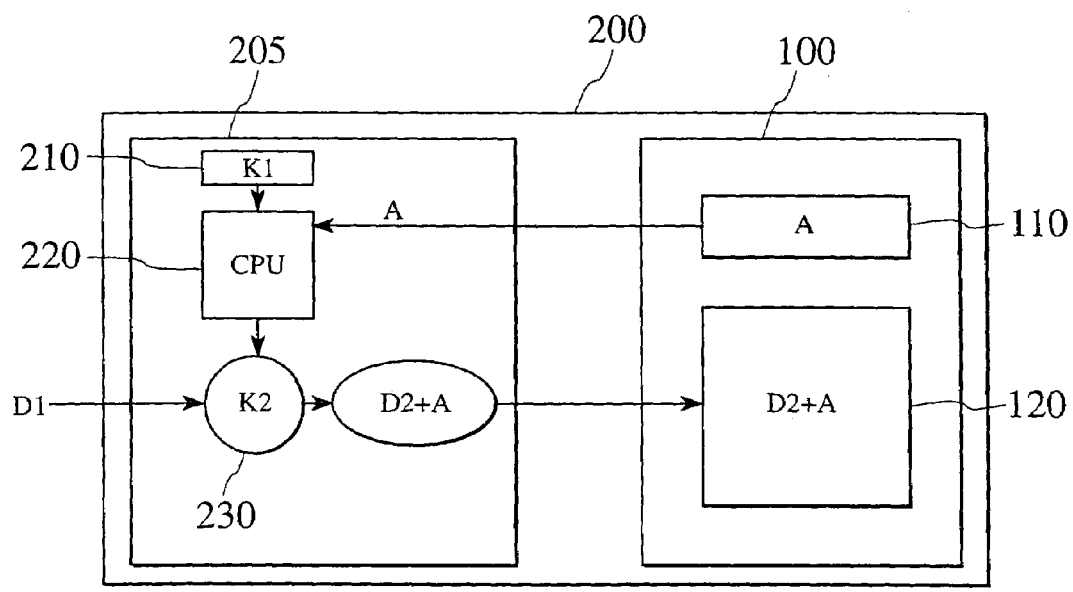
FIG. 13 shows a data recorder and data storage medium according to a second embodiment of the present invention.

FIG. 13 shows a data recorder 200, a data recording medium 100, and a flow of data D1 supplied to the recording medium 100 from the outside, according to the second embodiment.

The data recorder 200 may be the data recorder-reader 30 of FIGS. 3 and 4. The data storage medium 100 is an IC card having a semiconductor memory, such as the memory card 21, the smart card 11.

The data recorder 200 has a data processing unit 205. The data processing unit 205 may be the smart card 11 of FIG. 5 having a CPU inserted into the data recorder 200.

The data storage medium 100 has a first memory area 110, which is read-only, i.e., not rewritable or erasable and stores certification data A, and a second memory area 120 that is rewritable. The data processing unit 205 has a nonvolatile memory 210 for storing a first encode key K1 and a CPU 220.

The CPU 220 acquires the certification data A from the first memory area 110 of the data storage medium 100, reads the first encode key K1 from the nonvolatile memory 210, and generates a second encode key K2 based on the certification data A and first encode key K1. The second encode key K2 is used to encode data D1 supplied from the outside into data D2. The encoded data D2 is recorded in the second memory area 120 of the data storage medium 100. At this time, the certification data A read out of the data storage medium 100 is recorded in the second memory area 120 together with the encoded data D2.

Figure 14:
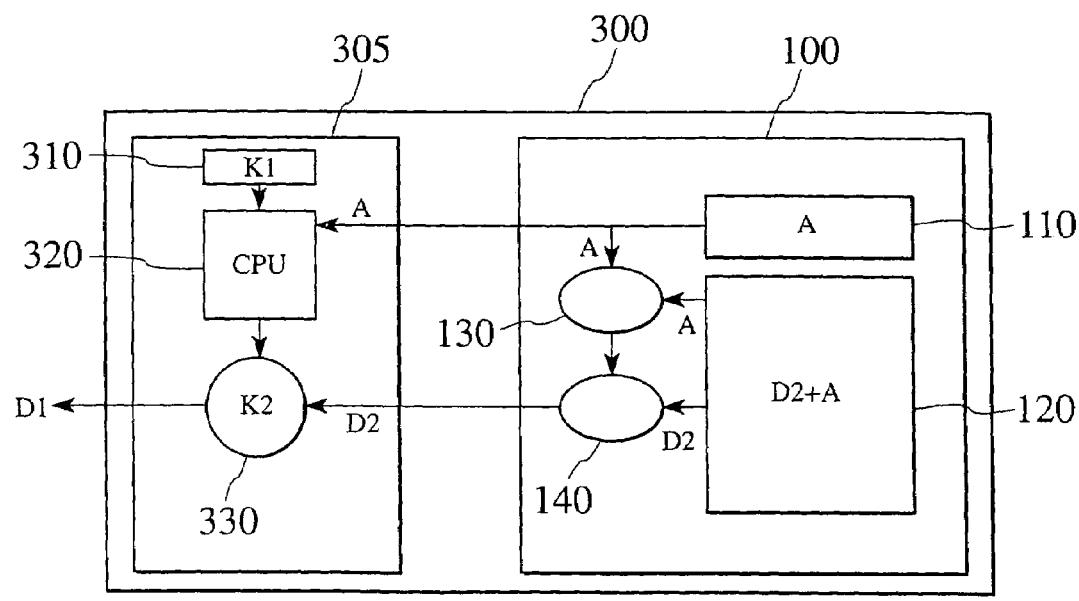
FIG. 14 shows a data reader and data storage medium according to the second embodiment.

FIG. 14 shows a data reader 300, a data storage medium 100, and a flow of decoding encoded data D2 stored in the data storage medium 100 into data D1, according to the second embodiment.

The data reader 300 may be the data recorder-reader 30 of FIGS. 3 and 4. The data reader 300 has a data processing unit 305, which may be the smart card 11 of FIG. 5 having a CPU inserted in the data reader 300.

The data storage medium 100 has a first memory area 110, which is read-only, i.e., not rewritable or erasable and stores certification data A, and a second memory area 120 for storing data D2 and certification data A written by the data recorder 200 of FIG. 13. The data storage medium 100 further has an identity circuit 130 for determining whether or not the certification data A stored in the second memory area 120 is identical with certification data A that is stored in the first memory area 110 and is unique to the data storage medium 100, and an output controller 140 for providing the data D2 only when the identity circuit 130 determines that the two pieces of the certification data A are identical with each other. The data processing unit 305 has a nonvolatile memory 310 for storing a first encode key K1 and a CPU 320.

The CPU 320 acquires the identification data A from the first memory area 110 of the data storage medium 100, reads the first encode key K1 from the nonvolatile memory 310, and generates a second encode key K2 based on the certification data A and first encode key K1. The CPU 320 reads the data D2 from the second memory area 120 of the data storage medium 100, decodes the data D2 based on the second encode key K2 into data D1, and provides the decoded data D1 to the outside.

If the identity circuit 130 determines that the certification data in the second memory area 120 is different from the certification data in the first memory area 110, the output controller 140 never outputs the data D2 from the second memory area 120 to the outside.

If an illegal access path X is formed between the data storage medium 100 and the data recorder 200 or data reader 300 to insert false certification data Ax as shown in FIGS. 11 and 12, the identify circuit 130 of the data storage medium 100 of the second embodiment determines that the certification data Ax is different from the certification data A unique to the data storage medium 100, and then, the output controller 140 never provides data stored in the data storage medium 100 to the outside. As a result, the illegal access is unable to read meaningful data from the data storage medium 100.

The identity circuit 130 and output controller 140 may be formed with a semiconductor memory into a semiconductor memory chip of the data storage medium 100, or may be formed into a separate semiconductor chip, which is added to a semiconductor memory chip of the data storage medium 100. The identity circuit 130 and output controller 140 may be formed in an optional way according to requirements.

Other data storage media and identity circuits according to the second embodiment will be explained.

Figure 15:
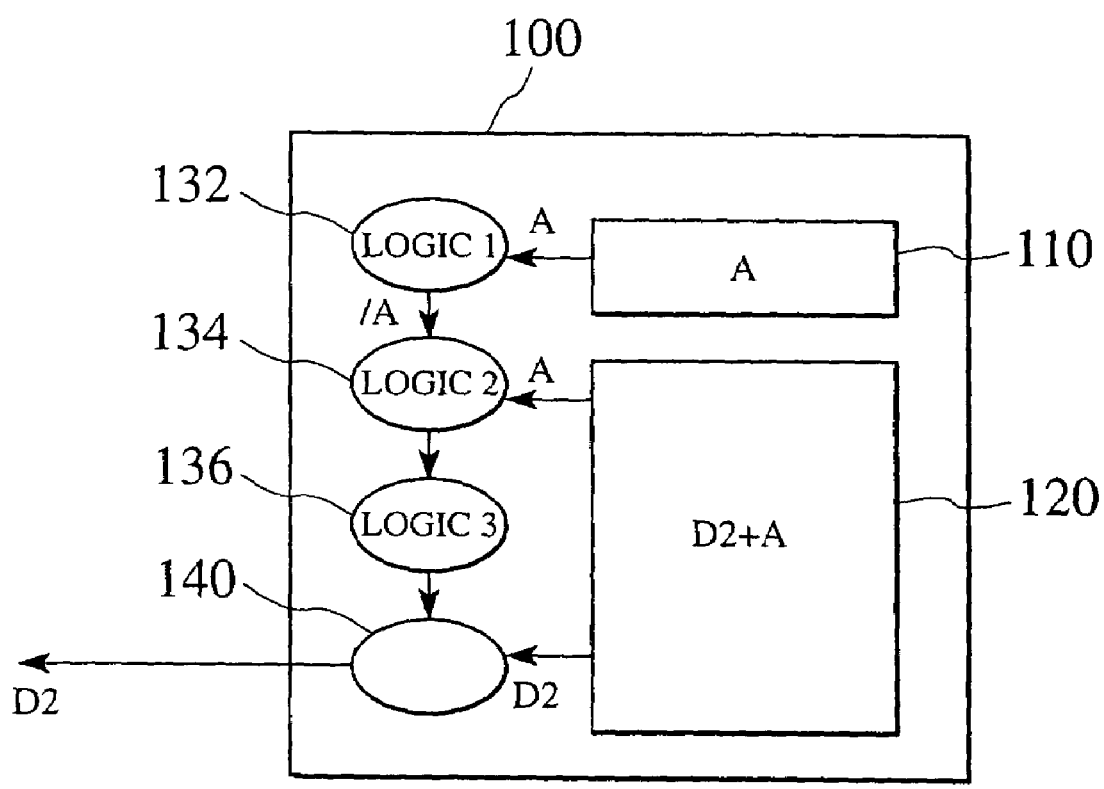
FIG. 15 shows a data storage medium according to the second embodiment.

FIG. 15 shows a data storage medium 100 according to the second embodiment of the present invention. The data storage medium 100 has an identity circuit 130 consisting of logic circuits 132, 134, and 136 to improve security.

Certification data A stored in a first memory area 110 of the data storage medium 100 is a 128-bit binary number made of is and 0s. In the following explanation, certification data A is equal to a certification number A.

The first logic circuit 132 reads a genuine certification number A from the first memory area 110 and generates an inverted number /A of the certification number A. The second logic circuit 134 reads the inverted number /A and a certification number A from a second memory area 120 of the data storage medium 100. The certification number A in the second memory area 120 was written by the data recorder 200 of FIG. 13. The third logic circuit 136 adds the certification number A from the second memory area 120 to the inverted number /A and provides a sum. If each bit of the 120 bit sum is 1, the certification number A in the second memory area 120 is identical with the genuine certification number A in the first memory area 110. As a result, an output controller 140 provides data D2 from the second memory area 120 to the outside. The output controller 140 is, for example, a switch circuit made of transistor elements.

Recently, data storage media called 'smart media', which is one of memory card, have been spread. The smart media serving as data storage media according to the second embodiment will be explained. The smart-media have each a semiconductor memory and are standardized according to SSFDC Forum in memory capacities of 2 MB, 4 MB, 8 MB, 16 MB, 32 MB, 64 MB, and 128 MB. As shown in FIG. 2, each smart medium has at least one NAND-type flash memory chip and a 22-pin flat electrode to transfer signals with respect to the outside.

A technique of storing certification data that is unique to each smart medium will be explained with reference to FIGS. 16 to 18. FIG. 16 shows the structure of a semiconductor memory of a 32-MB smart medium. There are blocks 0 to 2047 each of 16 KB. All blocks are readable and writable. There is one hidden block, which is an OTP (one time PROM) that is writable only once and is repeatedly readable. This hidden block corresponds to the first memory area 110 of the data storage medium 100.

FIG. 17 shows the structure of the hidden block. The hidden block consists of pages 0 to 31 each of 528 bytes.

Before shipment, unique 128-bit certification data is written into one of the pages. The certification data is a set of certification data A and inverted certification data /A (A+/A), to easily detect illegally written data.

The OTP is writable only once. Namely, the OTP allows correct data to be written therein once. More precisely, no 1s are additionally writable to the OTP, and any 0s are repeatedly writable to the OTP. This means that it may possibly alter a genuine certification number A in a smart medium to all 0s illegally. To prevent this, inverted data /A is together written into the smart medium because it is impossible to add 1s to the OTP. Even if a genuine certification number A is rewritten to all 0s, it is impossible to rewrite the inverted data /A to all 1s. This enables the detection of illegally altered data.

Figure 18:
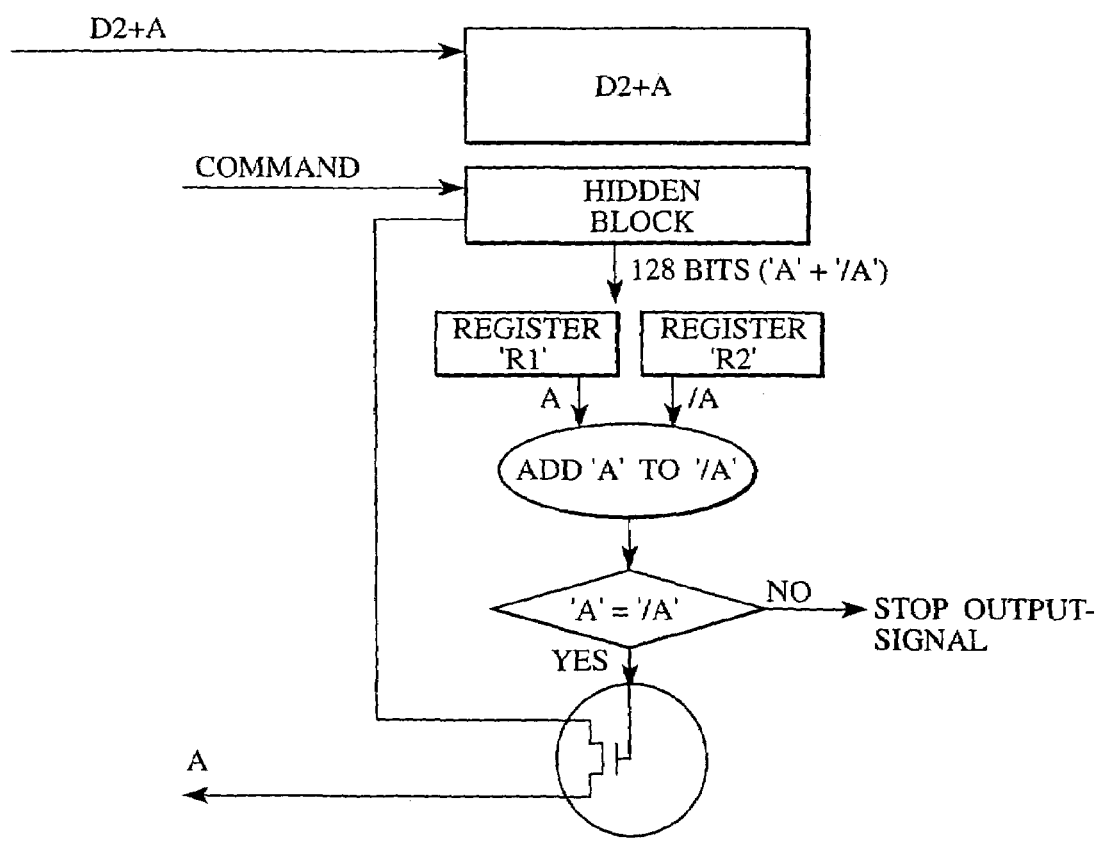
FIGS. 18 to 22 show data storage media according to the second embodiment.

FIG. 18 shows processes in a data storage medium when writing digital data D2 therein through a data recorder. As explained with reference to FIG. 13, a certification number A is transferred from the data storage medium 100 to the data processing unit 205 of the data recorder 200. At this time, the arrangement of FIG. 18 prohibits the transfer of the certification number A to the data processing unit 205 if the certification number A has illegally been altered.

In FIG. 18, the data storage medium is a smart medium having a hidden block that is accessible with a special command. The hidden block stores a 128-bit certification number A and 128-bit inverted data /A (A+/A).

The data processing unit 205 of the data recorder 200 issues the special command to access the hidden block of the smart medium, which outputs the data set of A+/A. The data A is stored in a register R1 and the inverted data /A in a register R2, both the registers R1 and R2 being in the smart medium. The registers R1 and R2 are simple circuits, which may be formed with a semiconductor memory in a semiconductor memory chip of a data storage medium or may be formed on a separate semiconductor chip.

An identity circuit of the data storage medium adds the data in the registers R1 and R2 to each other and determines whether or not the sum consists of all is. Only when the sum consists of all 1s, a transistor switch is turned on to output the certification number A from the hidden block to the recorder 200. If the certification number A has illegally been altered, the sum does not consist of all 1s. In this case, the transistor switch provides no output, and the write operation of the data D2 into the smart medium is terminated. The arrangement of FIG. 18 makes the smart medium useless if the certification number of the smart medium has been altered, thereby preventing an illegal manipulation of the certification number.

If the sum consists of all 1s, the data recorder 200 uses the certification number A and a first encode key to generate a second encode key K2, as shown in FIG. 13. Digital data D1 supplied from the outside is encoded based on the second encode key K2 into encoded data D2, which is recorded with the certification number A in the smart medium. The smart medium stores the data D2 and certification number A together. The certification number A thus stored is accessible with a sequence.

Figure 19:
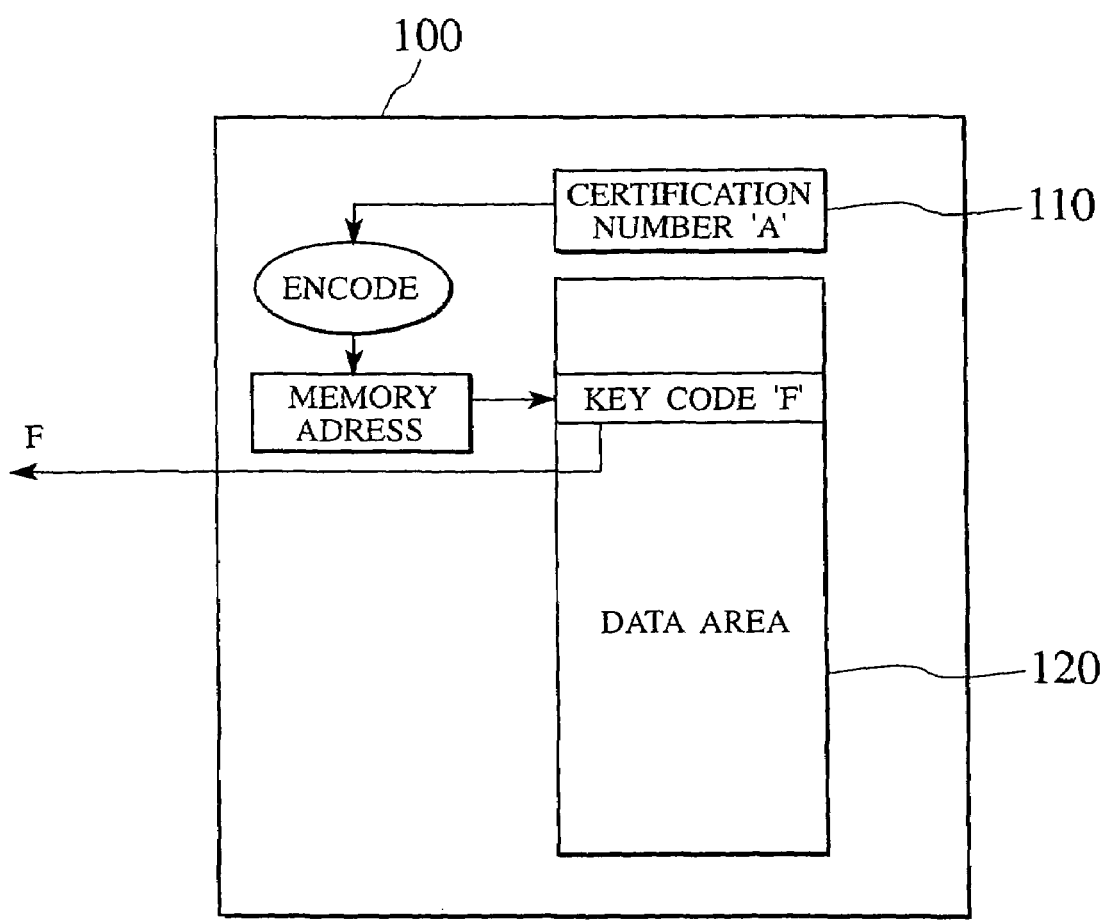

FIG. 19 shows an example of the sequence encoding a certification number A stored in the hidden block of a first memory area 110 of a smart medium 100. The encoded certification number is used to specify an address in a second memory area 120 of the smart medium 100 where key data F modified by using the certification number A is written. The key data F is provided to the outside instead of the certification number A. Since the certification number A itself is not provided to the outside, the illegal withdrawing of the certification number A will be prevented.

Figure 20:
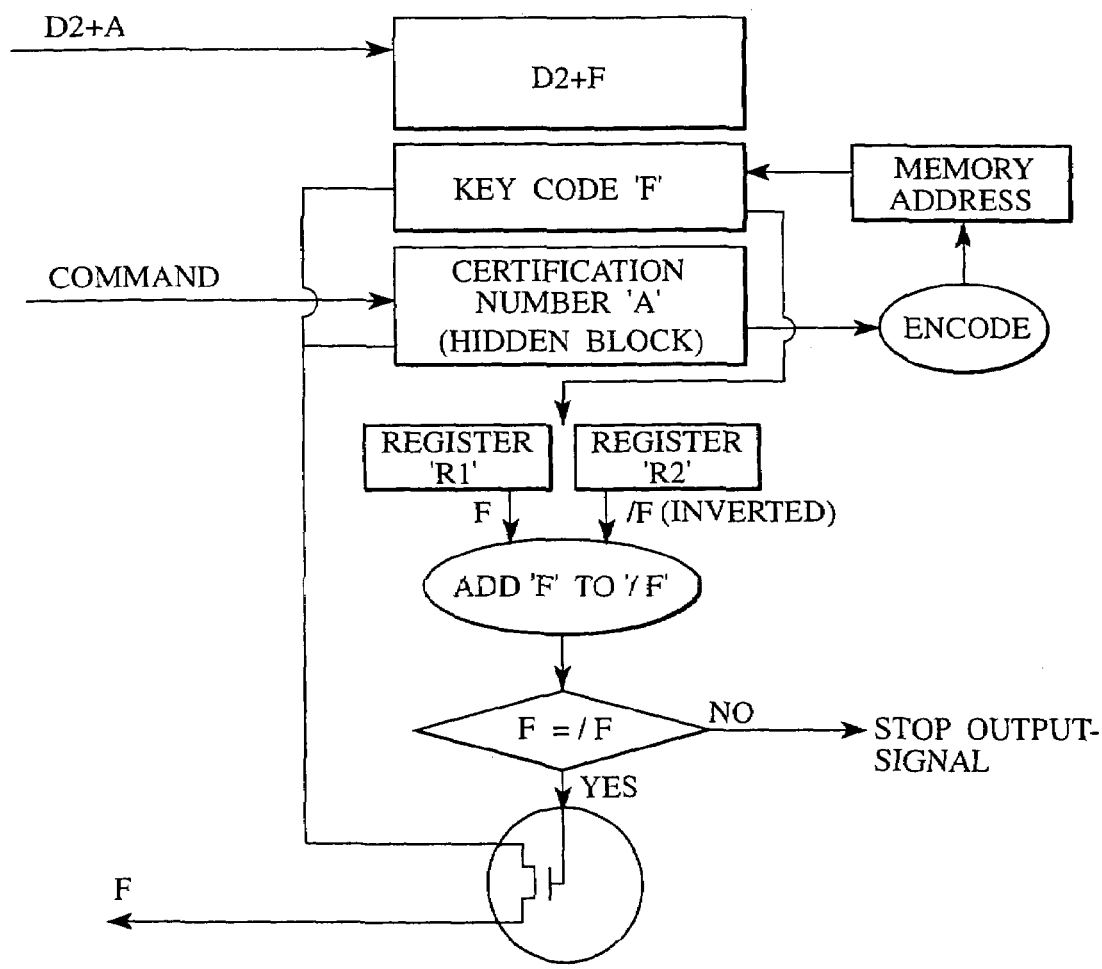

FIG. 20 shows a technique of improving the security of data stored in a smart medium. This technique distributes certification data A over data D2 in the smart medium, collects the distributed certification data according to a given sequence, and restores the certification data A. In addition, this technique encodes a certification number A stored in the hidden block of the smart medium to select memory address and generate key code F, so that the key data F is passed to an external device instead of the certification A. This further improves the security of the certification data and contents data stored in the smart medium.

Figure 21:
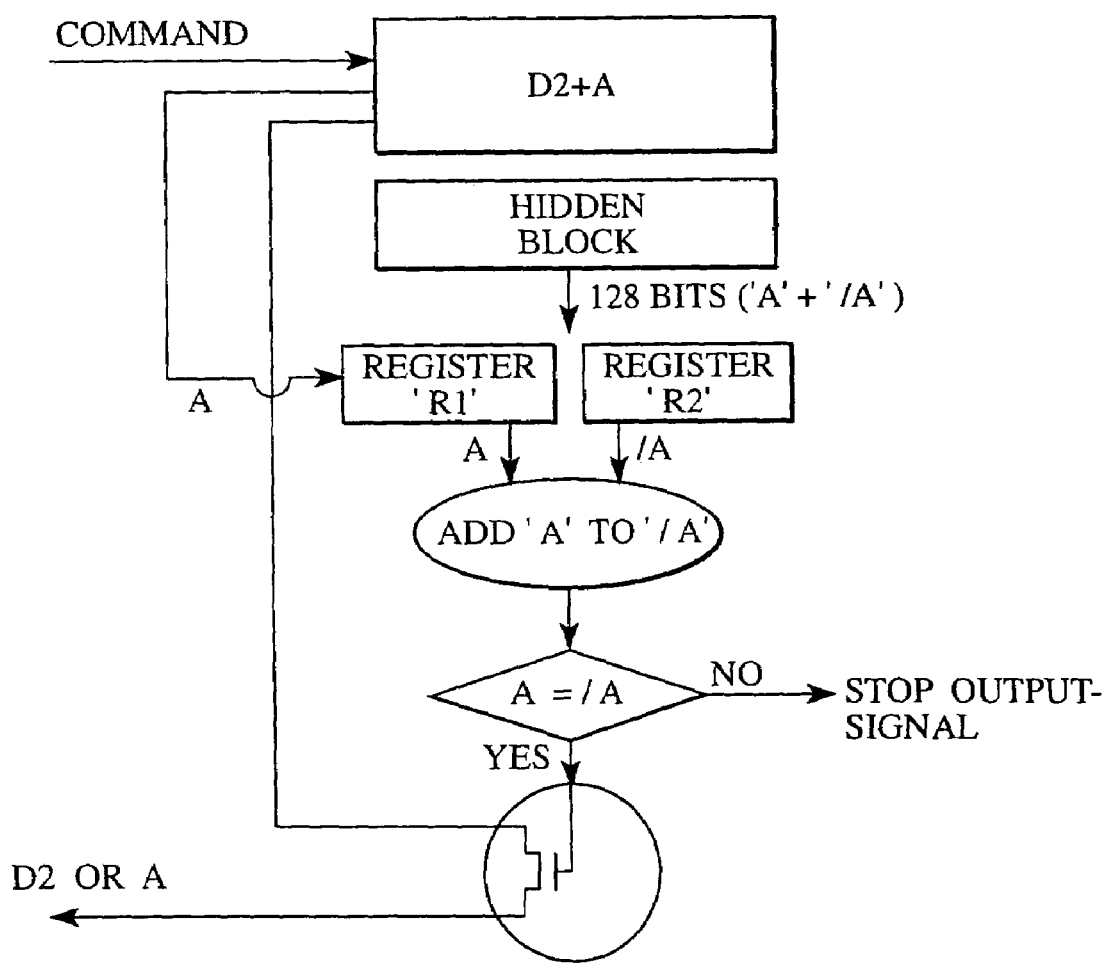

FIG. 21 shows a technique of reading digital data from a data storage medium 100 with the data reader 300 of FIG. 14. The data storage medium 100 is a smart medium.

The data processing unit 305 of the data reader 300 issues a special command to access the smart medium. In response to the special command, a certification number A written with data D2 in a second memory area 120 of the smart medium is read and transferred to a register R1. At the same time, inverted data /A from a data set of A+/A stored in the hidden block of a first memory area 110 of the smart medium is transferred to a register R2.

The data in the registers R1 and R2 are added to each other to provide a sum. If the sum consists of all 1s, a transistor switch is turned on to provide the data D2 from the second memory area 120 to the reader 300. If the sum does not consist of all 1s, it is determined that the certification number read by the reader 300 differs from the certification number unique to the smart medium. This means that the certification number in the second memory area 120 has illegally been written. In this case, the smart medium provides no output data, and the read operation is terminated.

If the sum consists of all 1s, a path for outputting the data D2 to the reader 300 is made. As shown in FIG. 14, the data processing unit 305 of the reader 300 issues a special command to acquire the certification number A from the hidden block of the smart medium and generates a second encode key K2 according to the certification number A and a first encode key K1. The second encode key K2 is used to decode the data D2 read out of the smart medium into data D1, which is supplied to the outside. These access may be executed simultaneously.

Figure 22:
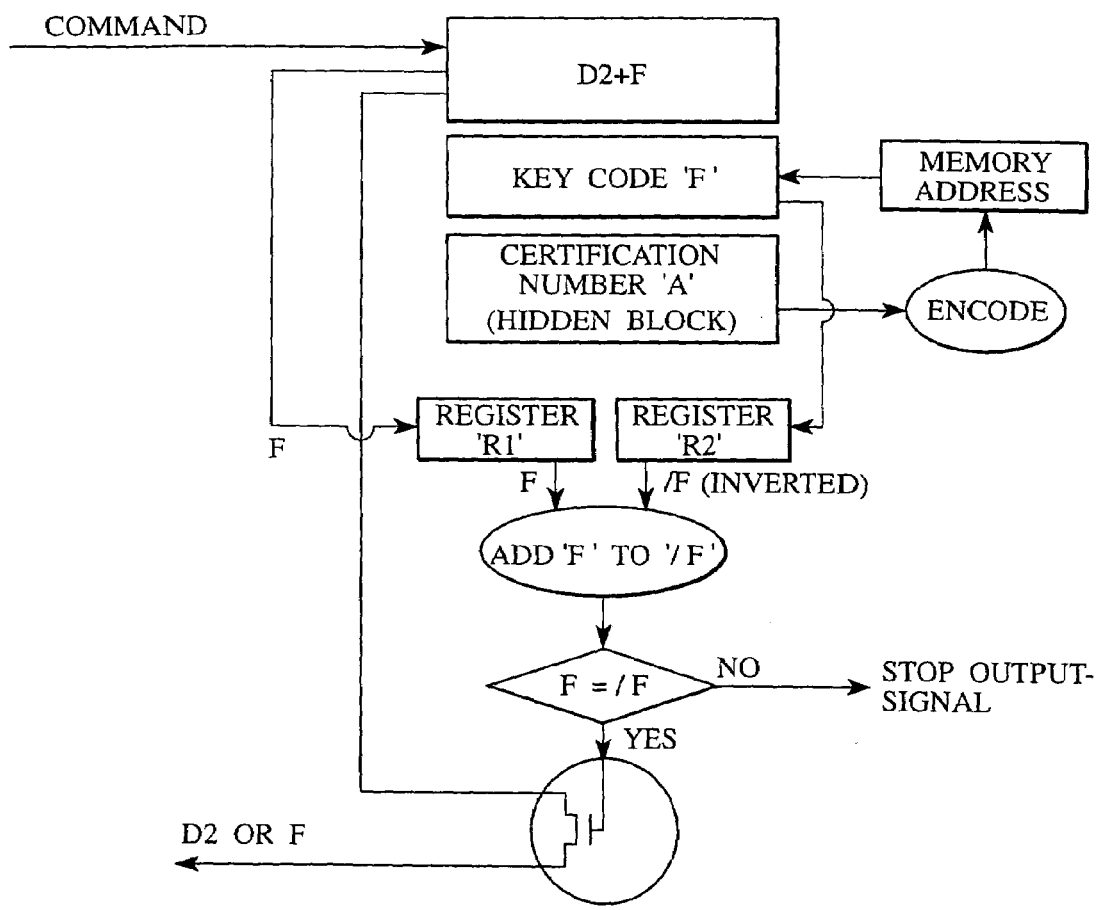

FIG. 22 shows a technique that employs key data F. Because of using a key data F which is modified from a certification number A. A certification number A will never be withdrawn from the hidden block of a smart medium. This further improves the security of data stored in the smart medium.

In this way, each data storage medium of the second embodiment has an identity circuit for determining whether or not certification data stored in a first memory area of the data storage medium is identical with certification data handled by an external device, and a switch for outputting recorded data to the outside only when the identity circuit proves identity between the two pieces of certification data. The second embodiment prevents an illegal alteration of certification data or illegal copying of data, thereby improving the safety of data in data storage media.

Third Embodiment

The data storage medium of any one of the first and second embodiments has a first memory area that is read-only and a second memory area that is rewritable. The first memory area stores certification data A, which is used as a part of an encode key, or a key to again encode an encode key, to prevent the illegal copying of digital data stored in the data storage medium.

The certification data stored in the data storage medium must be read-only so that the certification data itself may not be altered.

To achieve this, certification data may be written in a mask ROM (read-only memory), which is packaged in a data storage medium during manufacturing. Alternatively, a memory area for storing certification data may be prepared in an OTP (one-time PROM). These techniques need complicated manufacturing processes or structures to increase manufacturing time and cost.

Another technique is to write certification data in a memory area through data lines in manufacturing processes and cut fuses of the data lines by, for example, laser so that no more signals will be sent to the memory area.

Cutting fuses by laser, however, complicates manufacturing processes and increases costs. Although physically cutting fuses seems to be a sure way, it actually involves human errors and it is difficult to visually check to see if the fuses have completely been cut, thereby causing a reliability problem in the read-only property of the memory area.

The third embodiment provides data storage media whose first memory areas for storing certification data are easily and surely made read-only.

A memory card serving as data storage medium of the third embodiment will be explained.

As shown in FIG. 2, the memory card has an external terminal 22, an area 81 where a write-prohibition seal is attached, an area 82 where an index label is attached, and an area 83 where the capacity, source voltage, type, etc., of a memory chip are written. The memory card 21 has a corner cut 84 that is on the left or right side depending on a source voltage for the memory card 21. A memory card operating on a source voltage of 5 V has a cut on the left in an insertion direction, and a memory card operating on a source voltage of 3.3 V has a cut on the right in an insertion direction. The cut prevents an erroneous insertion into a slot of a card handling device. If the memory card of 3.3 V receives a source voltage of 5 V, a semiconductor memory chip thereof will be broken. The cut prevents this sort of accident.

Figure 23:
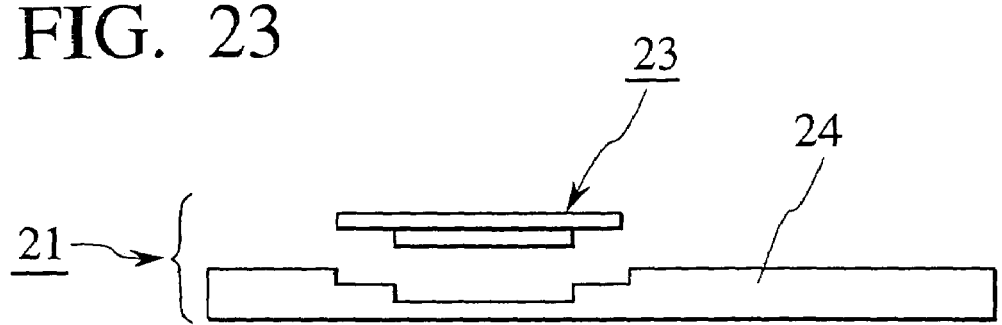
FIGS. 23 to 25 show data storage media according to a third embodiment of the present invention.

FIG. 23 shows a structure of the memory card 21. The memory card 21 mainly consists of a package 23 and a base card 24. The package 23 has a semiconductor memory chip on one surface and an external terminal on the other surface. The base card 24 supports the package 23.

Figure 24:
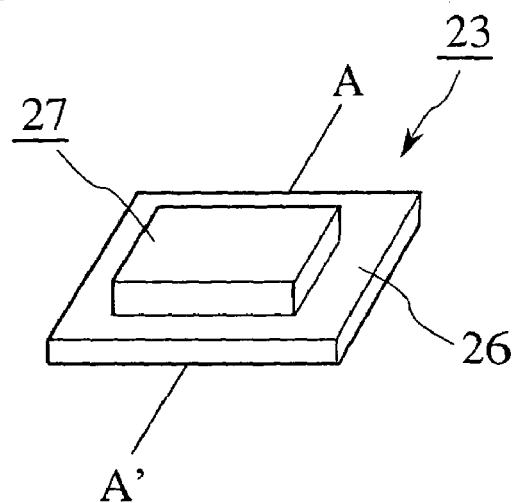
Figure 25:
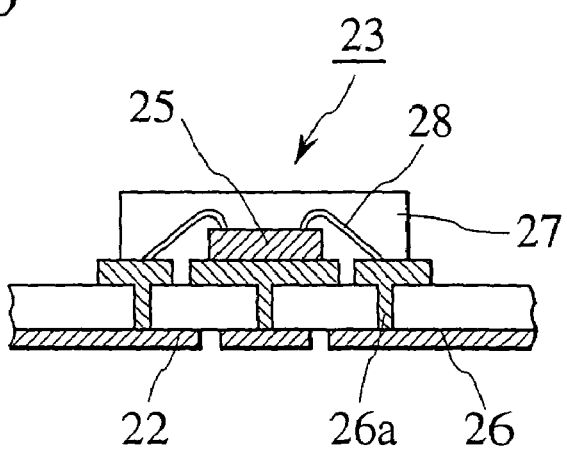

FIGS. 24 and 25 show the details of the package 23. The package 23 has a wiring board 26 made of resin on which the memory chip 25 is mounted, and molded resin 27 to cover the memory chip 25. The memory chip 25 is connected to the wiring board 26 with wire bonding 28.

On the opposite side of the memory chip 25, the package 23 has the external terminal 22, which is electrically connected to the memory chip 25 with through-holes 26a formed in the wiring board 26. The surface of the terminal 22 is plated with gold. The purity of the gold may be about 99.5% to improve mechanical abrasion resistance. The thickness of the package 23 is about 0.65 mm.

The base card 24 has a stepped recess to receive the wiring board 26 and fix the package 23.

When the package 23 is fixed to the base card 24, the terminal 22 of the package 23 is flush with the surface of the base card 24. The bottom of the recess of the base card 24 is slightly deeper than the thickness of the molded resin 27 of the package 23 to release stress on the memory chip 25 and increase a margin for controlling the thickness of the molded resin 27 when the molded resin 27 is formed.

A part of the base card 24 corresponding to the memory chip 25 is very thin, and therefore, is formed by injection molding with the use of, for example, a PC/ABS alloy having high fluidity.

The package 23 is fixed to the base card 24 with a thermocompression sheet mainly made of rubber. More precisely, the thermocompression sheet is set on the stepped part of the base card 24, the package 23 is placed on the sheet, and they are heated and compressed together.

Figure 26:
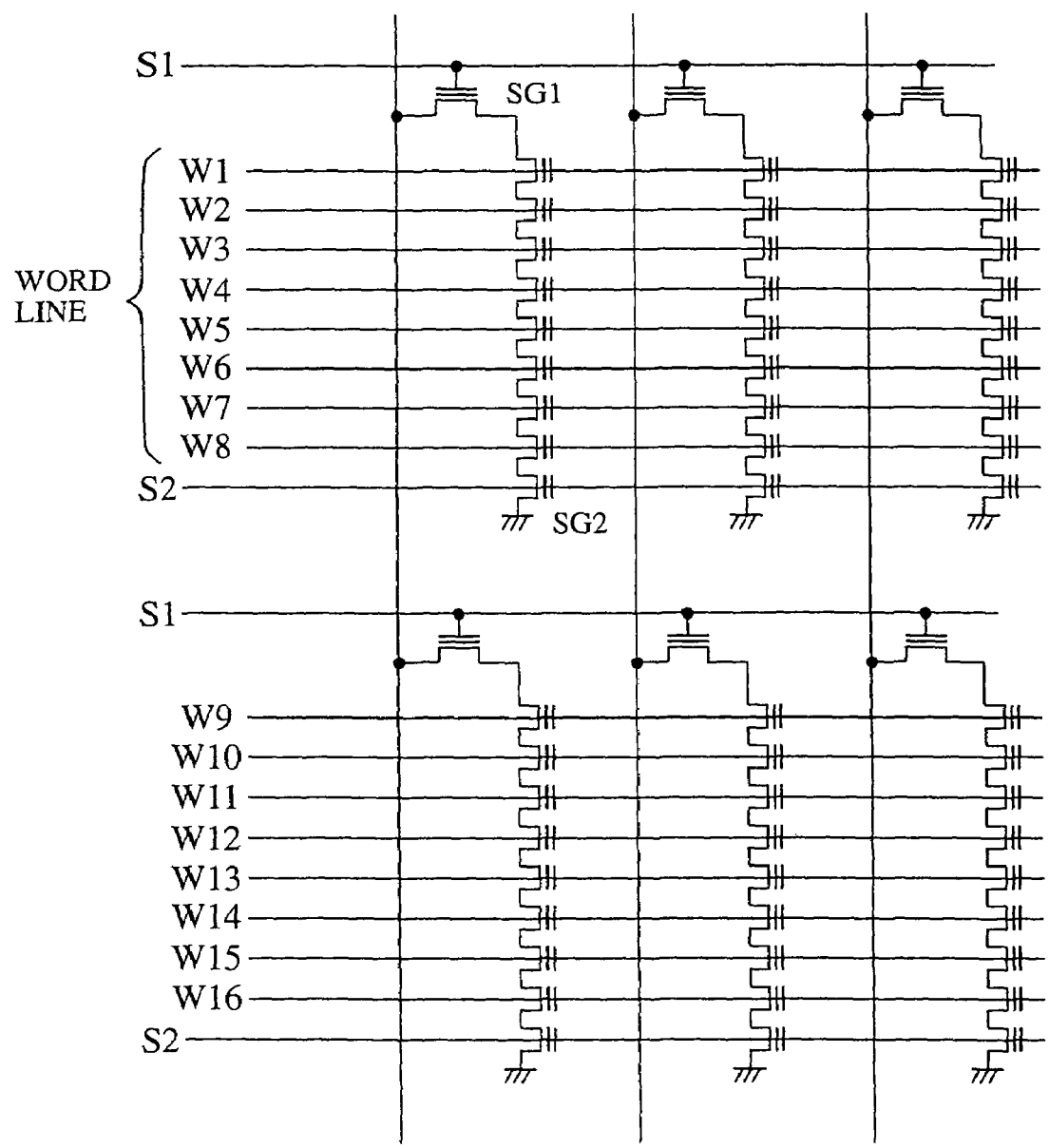
FIG. 26 shows memory cells of a NAND-type flash memory.

FIG. 26 shows an example of the structure of a memory cell array of a NAND-type flash memory in the memory chip 25.

A transistor SG1 connected to a select line S1 and a transistor SG2 connected to a select line S2 are turned on to activate a region of eight memory cell transistors. The eight memory cell transistors have control gates CGi that are connected to word lines Wi (W1 to W8), respectively. By controlling the voltage levels of the word lines Wi, each of the memory cell transistors can be read or written.

To read data from a target memory cell transistor connected to, for example, the word line W3, the word line is kept in a floating state, and a voltage of 3 to 5 V is applied to the other word lines to turn on the memory cell transistors connected thereto. Then, data of 0 or 1 is read out of the target memory cell transistor depending on conductivity between the select lines S1 and S2.

A write operation is carried out by applying a high voltage Vpp to the word lines Wi. To achieve this, a circuit for connecting the word lines Wi to the high voltage Vpp during a write state is formed.

Figure 27:
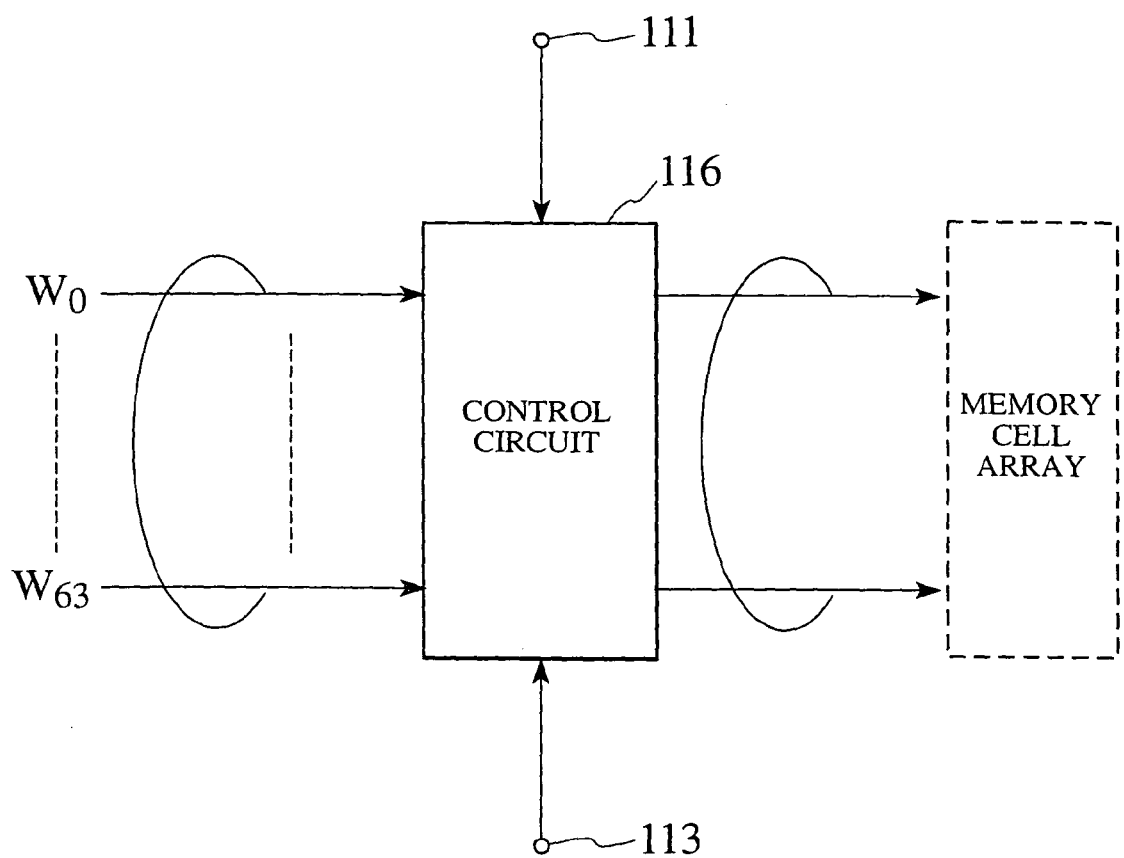
FIGS. 27 and 28 show a part of a data storage medium according to the third embodiment.

FIG. 27 shows an electric circuit that is used for making a first memory area of a data storage medium for storing certification data. Between word lines Wi and the memory cell array, a control circuit 116 is arranged in addition to a circuit that is connected to a line 111 to apply the high voltage Vpp in a write state. The control circuit 116 connects the high voltage Vpp to the word lines Wi only when a specific voltage is applied to a special terminal 113.

Figure 28:
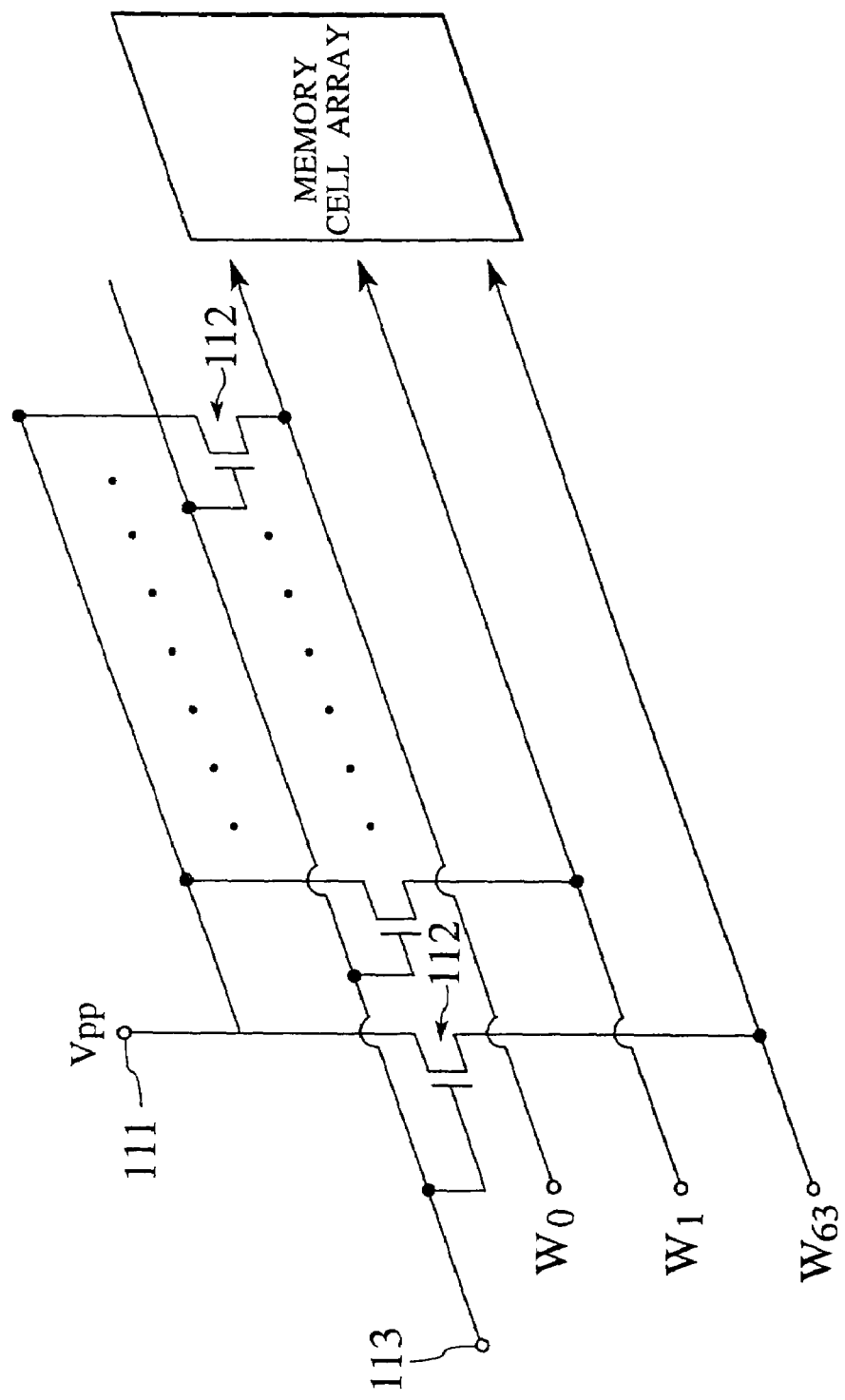

FIG. 28 shows an example of the control circuit 116. The high voltage Vpp is controlled by a transistor 112 whose gate is connected to the special terminal 113. Only when a gate control signal is applied to the special terminal 113, the transistor 112 is turned on to activate the line 111 for passing the high voltage Vpp. By using the control circuit 116, it becomes possible to control the high voltage Vpp to the word lines Wi, thereby controlling write and erase operations on memory cell array.

In this way, the data storage medium of the third embodiment has the transistor 112 between the power source line 111 for the high voltage Vpp and each word line Wi. By controlling the conductivity of each transistor 112 in response to an input signal applied to the special terminal 113, the third embodiment establishes a write-protect state for a given memory cell array. The source and drain of each transistor 112 are arranged between the line 111 and a word line Wi, and the gate electrode thereof is connected to the special terminal 113.

Management data such as unique certification data is written in specific memory cells of a semiconductor memory chip by applying a voltage to the terminal 113 to turn on each transistor 112 during the manufacturing of the memory chip. Thereafter, the memory chip is set in a module to form a data storage medium. At this time, the terminal 113 is sealed in the module and is electrically isolated from an external terminal of the memory chip. As a result, the memory cells that hold the certification data serves as a read-only first memory area.

Figure 29:
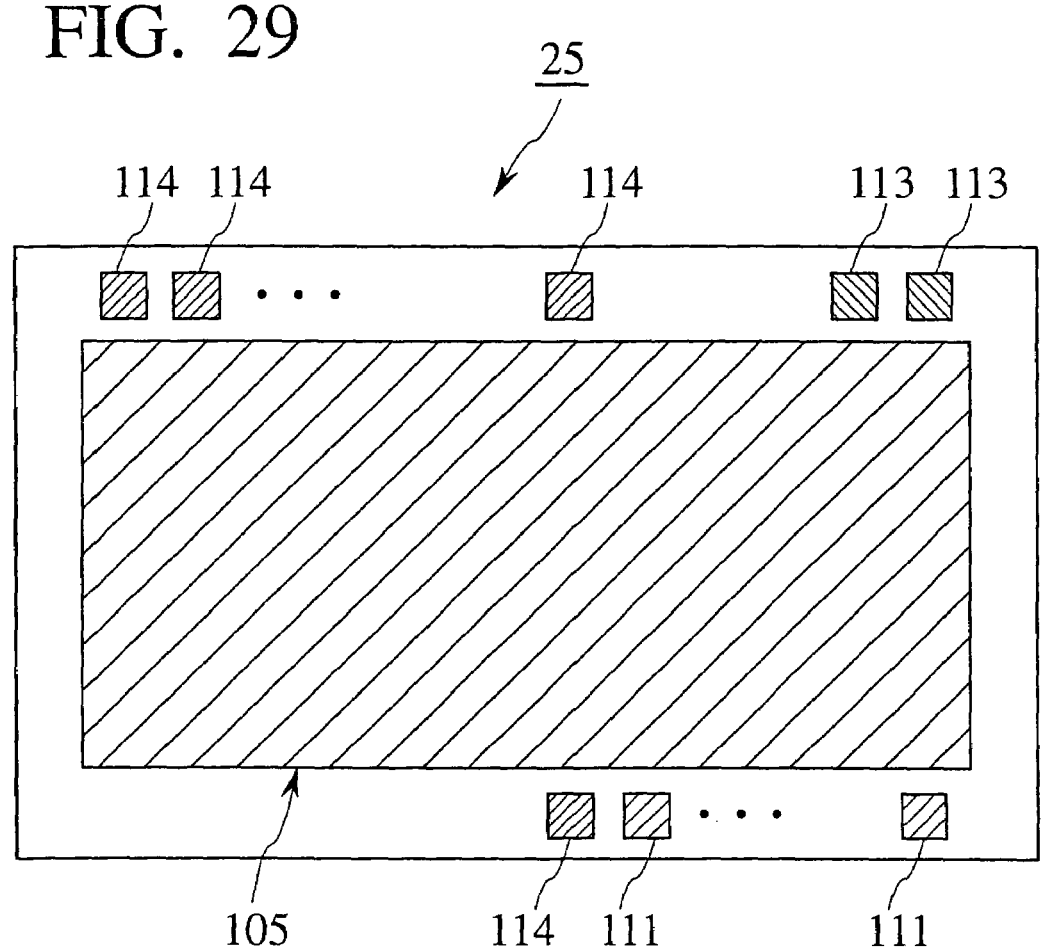
FIG. 29 is a plan view showing a semiconductor element in a data storage medium according to the third embodiment.

FIG. 29 shows an arrangement of the memory chip 25 according to the third embodiment. The memory chip 25 has an integrated circuit 105 containing a memory cell array and terminals 111 to 114 arranged around the integrated circuit 105. The terminals 111 to 114 are used to access the integrated circuit 105 from the outside. The terminal 111 is used to receive the high voltage Vpp from the outside. The terminal 114 is used to receive signals such as CLE, ALE, WE, WP, /CE, /RE, R/B, GND, and I/O. The high voltage Vpp may be generated by a high-voltage generator arranged in the integrated circuit 105.

As mentioned above, each data storage medium of the third embodiment has an arrangement to prohibit an external access to some terminals to secure a first memory area that is read-only and a second memory area that is programmable.

More precisely, the data storage medium of the third embodiment employs a control circuit such as the transistor 112 (FIG. 28) between the terminal 111 (FIG. 29) for receiving the high voltage Vpp and each word line Wi and controls the conductivity of the transistor 112 according to an input to the terminal 113 (FIG. 29), thereby realizing write protection for predetermined memory cells (the first memory area).

To prohibit an access to the terminal 113 from the outside, the third embodiment electrically separates the terminal 113 from the external terminal 22 of the data storage medium by sealing the terminal 113 in a module.

Figure 30:
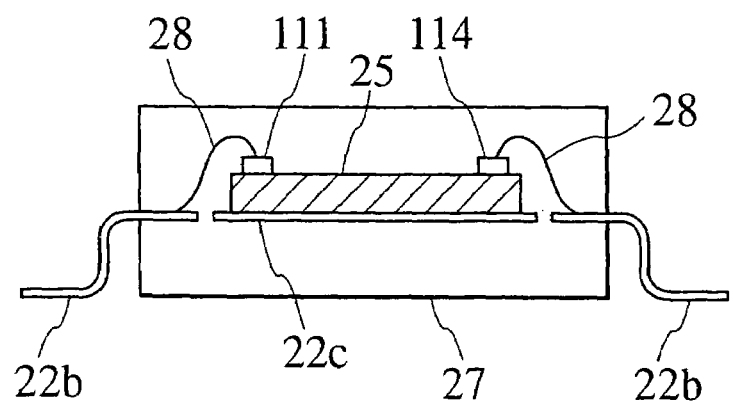
FIGS. 30 and 31 are sectional views each showing a part of a data storage medium according to the third embodiment.
Figure 31:
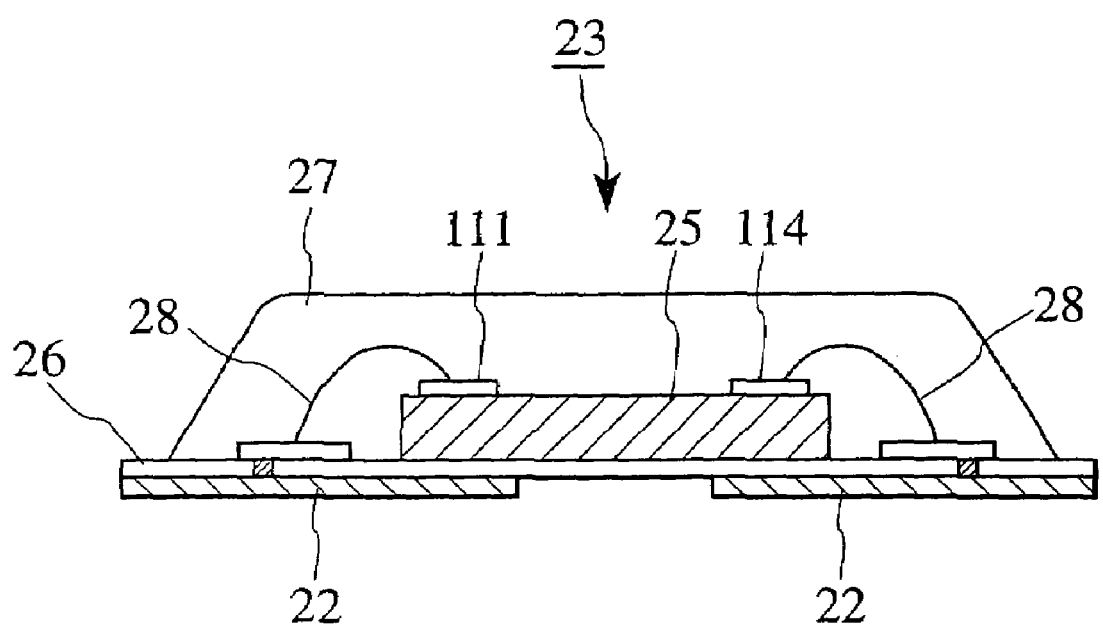

FIGS. 30 and 31 show examples of modules of data storage media according to the third embodiment. FIG. 30 shows a DIP-type data storage medium, and FIG. 31 shows a data storage medium that integrates an external terminal 22 into a memory module. In each of the examples, terminals 111 and 114 on a semiconductor memory chip 25 are electrically connected to the external terminal 22 with bonding wires 28. Conductive bumps may be employed to mount the memory chip in a face-down manner through flip-chip connections. Reference marks 22b and 22c are lead frames.

When the memory chip 25 is packaged in molded resin 27, the terminals 111 and 114 are connected to the external terminal 22 (22b), to transmit and receive signals to and from the outside. On the other hand, the control terminal 113 for controlling the line for applying the high voltage Vpp to word lines Wi is electrically separated from the external terminal 22 (22b).

The control terminal 113 is accessible only during a chip inspection process and die sort test in which the memory chip 25 is still on a wafer. When the control terminal 113 is still accessible, the high voltage Vpp is applied to the word lines Wi connected to the first memory area of the memory chip 25, to write unique certification data therein. Thereafter, the control terminal 113 is sealed within a module so that the control terminal 113 is inaccessible without breaking the module. Namely, there will be no way to apply the high voltage Vpp to the word lines Wi connected to the first memory area of the memory chip 25.

Since the control terminal 113 is isolated from the external terminal 22 (22b), the first memory area in the memory chip 25 serves as a read-only area after the memory chip 25 is packaged.

In case of using another key data like key data F of FIG. 22, the first memory area may serve only for internal accesses in the memory chip 25. Alternatively, the first memory area may be a read-only area that serves only for internal accesses in the memory chip 25. Instead, the first memory area may be an area that allows a write operation only once and no erase operation.

A terminal for applying a write voltage to the word lines Wi of the first memory area may be separated from a terminal for applying an erase voltage.

During the manufacturing of a semiconductor memory chip, a wafer testing process may write 1 in every memory cell.

This may be realized by arranging at least one control terminal connected to a control line and by writing 1 into corresponding memory cells through the control terminal before dicing a wafer into semiconductor memory chips. When each memory chip is packaged, the terminal for applying an erase voltage is isolated from an external terminal (22, 22b).

At this time, the first memory area of each semiconductor memory chip can store data only once, so that certification data unique to the memory chip may be written into the first memory area. The terminal for applying a write voltage to the word lines of the first memory area may be connected to the external terminal 22, so that a user may record read-only (inerasable) management data in the first memory area if necessary.

Another OTP area to which data is written only once may be prepared in addition to the first memory area, to enable a user to store confidential information, security management data, and copy protection data.

As explained above, the third embodiment secures a specific memory cell array in a data storage medium as a read-only memory area to keep management data such as certification data related to the data storage medium. This data is used to prevent the illegal copying of data stored in the data storage medium and improve system security.

The manufacturing method of the third embodiment easily and surely prepares a read-only memory area in a data storage medium.

A NAND-type flash EEPROM mounted on the memory card 21 (FIG. 23) of the third embodiment will be explained.

A flash memory of, for example, 8 MB consists of 528 bytes×16 pages×1024 blocks and operates on a single source voltage of 3.3 V. This memory contains a 528 byte static register so that programming and reading operations between the register and a memory cell array is carried out by transferring 528-byte data each time.

An erase operation is carried out block (4 kilobytes+256 bytes) by block. Each page consists of 528 bytes including a redundancy of 16 bytes. The redundancy is used to store an ECC (error correction code) or management data.

The data storage medium of the third embodiment may use a part of the redundancy as a read-only area to store certification data unique to the data storage medium.

The flash memory mentioned above is a perfect serial memory that receives addresses, data, and commands through a flat I/O terminal and automatically executes a program and an erase operation in the memory.

Figure 32:
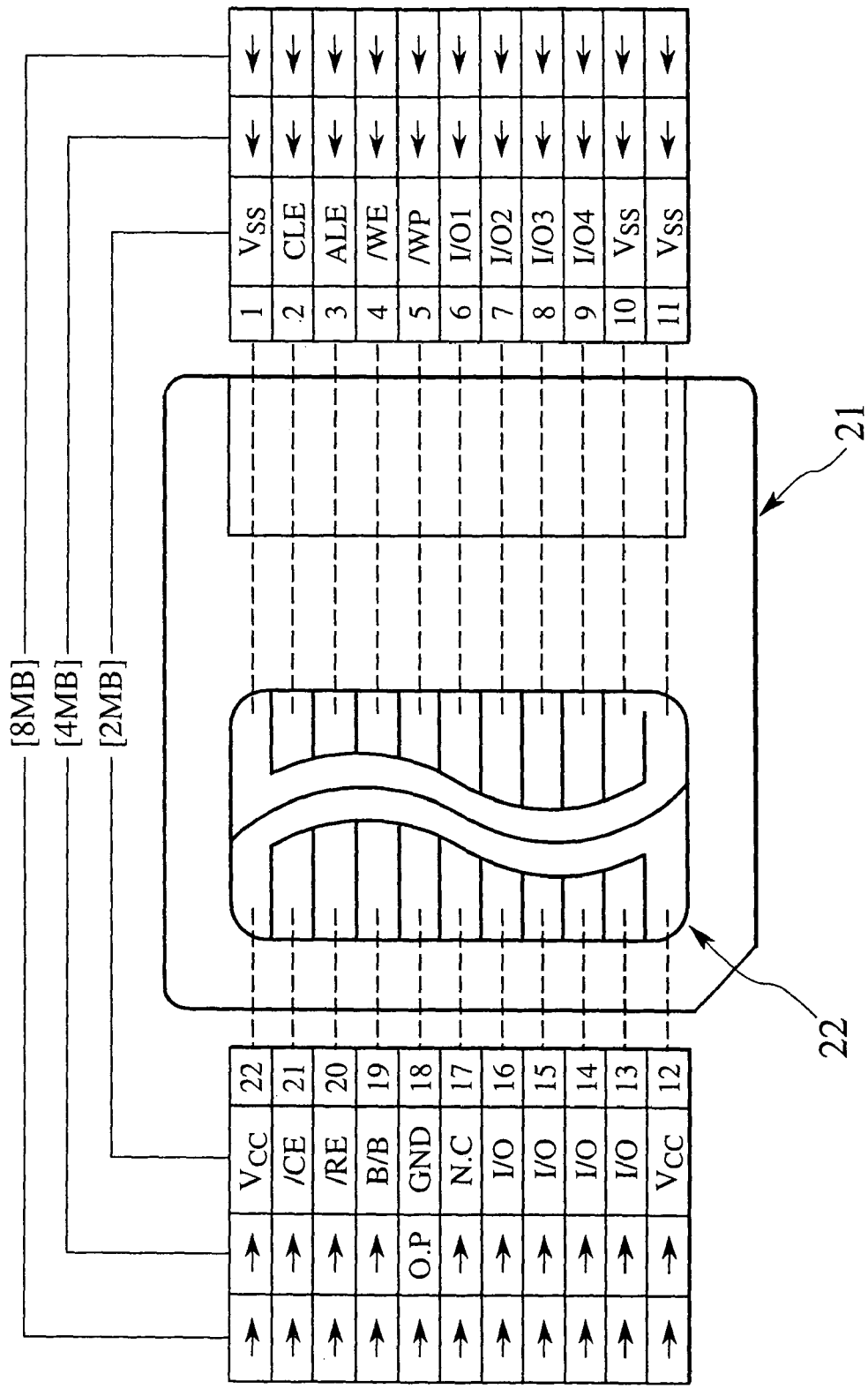
FIG. 32 shows a layout of external contact pins of a data storage medium.

FIG. 32 shows a pin layout of a memory card employing a NAND-type EEPROM of 2 MB, 4 MB, or 8 MB.

Figure 33:
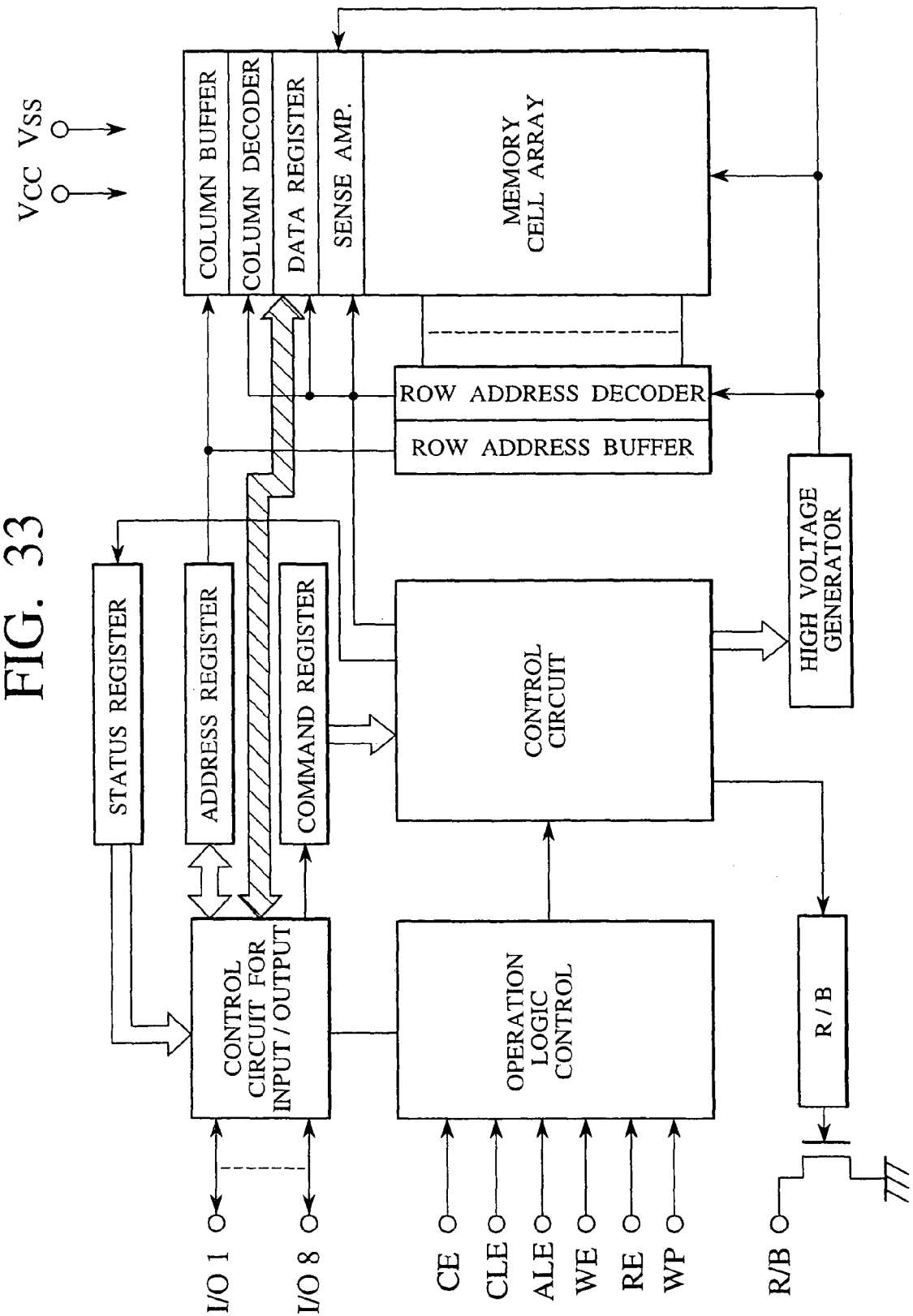
FIG. 33 shows an example of a circuit of a data storage medium.

FIG. 33 shows an example of a circuit of the memory chip 25 (FIG. 25) mounted on the memory card 21. The memory chip 25 has no address pins, and an address is entered in the memory chip 25 through I/O pins in several times. This arrangement reduces the number of pins and needs no increase in the number of pins even if the storage capacity of the memory is increased. This will be understood from the pin arrangement of FIG. 32. Accordingly, the data recorder-reader 30 of FIG. 4 can accept the memory card 21 irrespective of the capacity of the memory card 21. That is, the contact electrode 35 of the recorder-reader 30 is commonly used for different types of memory cards.

FIG. 34A shows an arrangement of a memory cell array of a 16-Mbit NAND-type EEPROM, FIG. 34B shows an equivalent circuit of the memory cell array of FIG. 34A, and FIG. 34C shows a memory cell array of a 4-Mbit NAND structure.

A memory cell transistor has a self-aligned, two-layer gate structure including a floating gate FGi and a control gate CGi both made of polysilicon.

In the 4-Mbit memory of FIG. 34C, eight memory cell transistors are arranged in series between two select transistors SG1 and SG2. In the 16-Mbit memory of FIG. 34A, 16 memory cell transistors are arranged in series between two select transistors SG1 and SG2. In FIGS. 34A and 34C, numeral 101 is a contact hole and 102 is a source line.

To write data into a flash memory, the floating gate FGi of a target memory cell must accumulate electrons. To achieve this, a high voltage Vpp is applied to the control gate CGi on the floating gate FGi.

A NAND-type flash memory injects electrons into a floating gate FGi based on a tunnel phenomenon. A NOR-type flash memory injects hot electrons into a floating gate FGi. The tunnel phenomenon of the NAND-type flash memory is achieved under a high voltage that is relatively low. Accordingly, the NAND-type flash memory has an internal step-up circuit for generating such a high voltage.

Data erase and write operations on memory cells are achieved by passing a tunnel current entirely through the channels of the memory cells.

Figure 35:
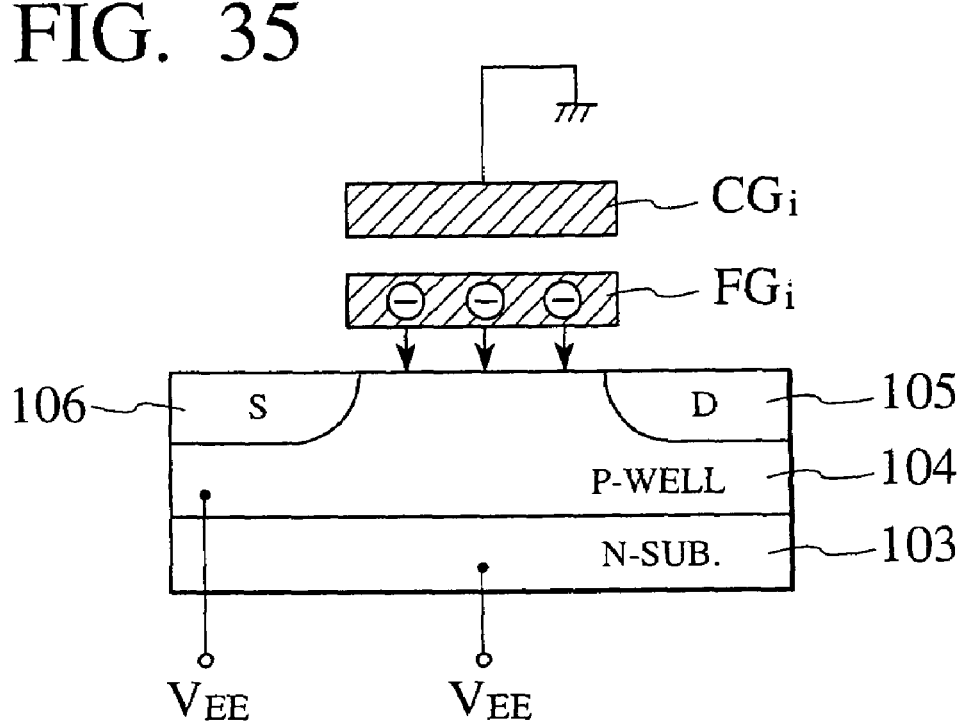
FIG. 35 is a sectional view showing an erase operation on an EEPROM cell.
Figure 36:
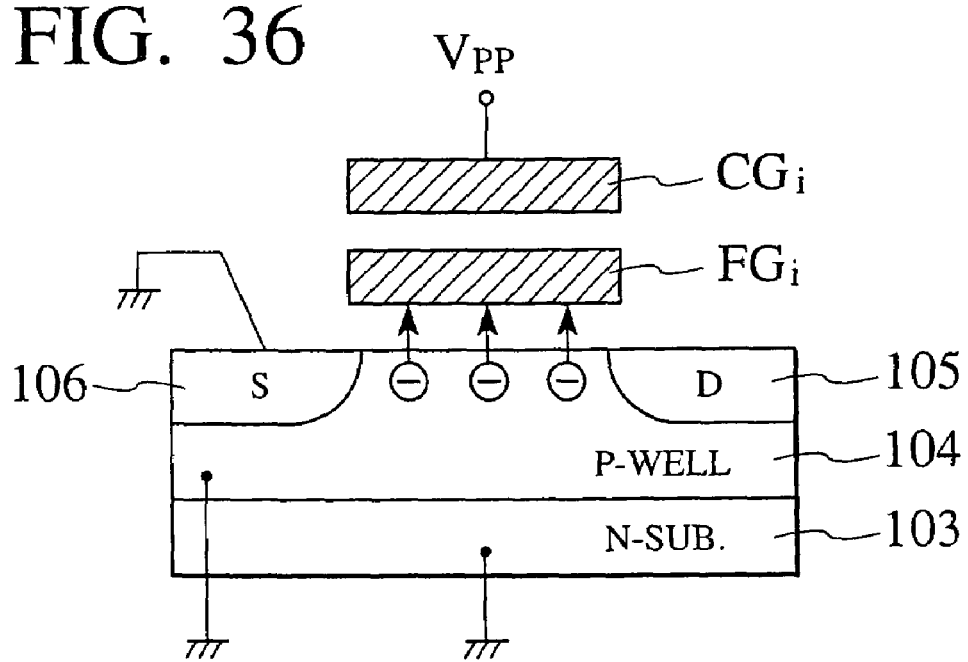
FIG. 36 is a sectional view showing a write operation on an EEPROM cell.

FIGS. 35 and 36 show erase and write operations, respectively, carried out on a memory cell of a flash memory.

The erase operation of FIG. 35 is carried out by setting a control gate CGi of the memory cell to 0 V and by applying a voltage $V_{EE}$ to an n-type substrate 103 and a p-type well 104. As a result, a tunnel current flows from a floating gate FGi to the substrate 103, to make the threshold of the memory cell negative. At this time, the tunnel current flows through the whole of the channel of the memory cell.

Opposite to the erase operation, the write operation of FIG. 36 is carried out by applying a voltage Vpp to the control gate CGi and setting the substrate 103 and well 104 to 0 V. As a result, a tunnel current flows from the substrate 103 to the floating gate FGi, to make the threshold of the memory cell positive. Like the erase operation, the tunnel current in the write operation flows through the whole of the channel of the memory cell.

In each memory cell to which no data is written, an intermediate potential Vp1 between 0 and Vpp is applied to a drain 106, to prevent an erroneous write operation. Passing a tunnel current through the whole of the channel of a memory cell in erase and write operations is advantageous in improving the reliability of the memory cell because bidirectional electric fields are applied to an oxide film where the tunnel current flows.

To pass a tunnel current through the whole of the channel of a memory cell for erase and write operations, a memory cell array and peripheral circuits are formed on separate p-type wells 104 on an n-type substrate 103. A wiring structure for the memory cells is made of, for example, three polysilicon layers and an aluminum layer. The third polysilicon layer has a laminated structure including $MoSi_2$. The aluminum metal wiring layer employs a barrier metal of Ti/TiN as a base.

To cope with a page-based program, the NAND-type EEPROM chip has a data register at the periphery of the chip. The data register serves as a sense amplifier and corresponds to a row of a memory cell array.

The EEPROM chip also has a step-up circuit for generating a high voltage for erase and write operations that are carried out under 5 V or 3.3 V. The operation modes are controlled in response to commands. A redundancy of 4 blocks and 2 columns is arranged in the memory chip.

Figure 37:
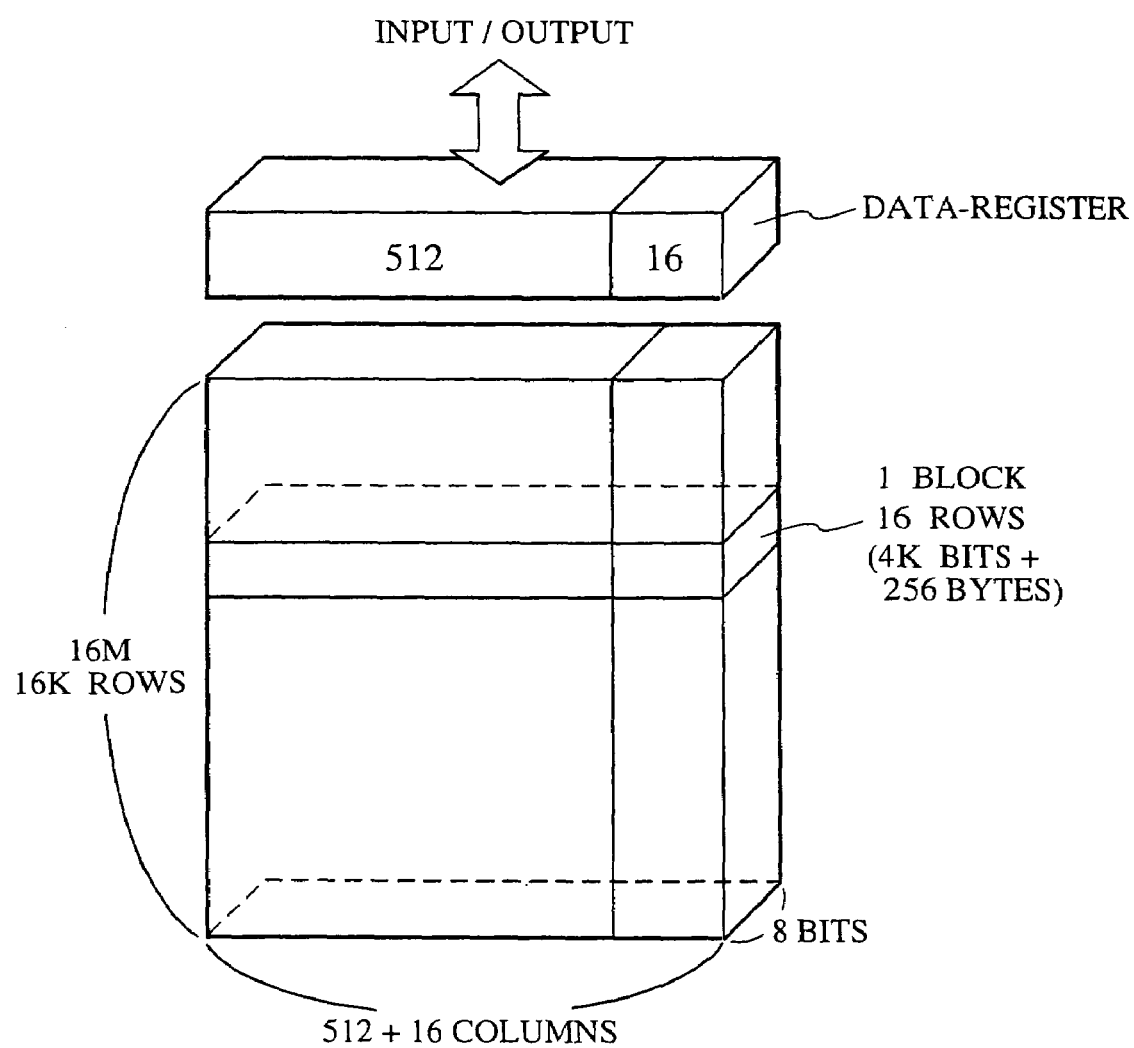
FIG. 37 shows the internal structure of a 16 M bits semiconductor memory cell array.

FIG. 37 shows the structure of an 8-MB memory cell array.

The memory cell array has 16 redundant bytes for every 512 bytes. Data write and read operations are carried out page by page through a data register.

The 8-MB memory cell array has a memory area of 16,000 rows each having 8 bits in depth. A part of this memory area or a redundant block is used to store unique certification data.

A read operation consists of a page access for transferring data from a selected row of memory cells to the data register and a serial access for transferring the data from the data register to an output terminal.

Figure 38:
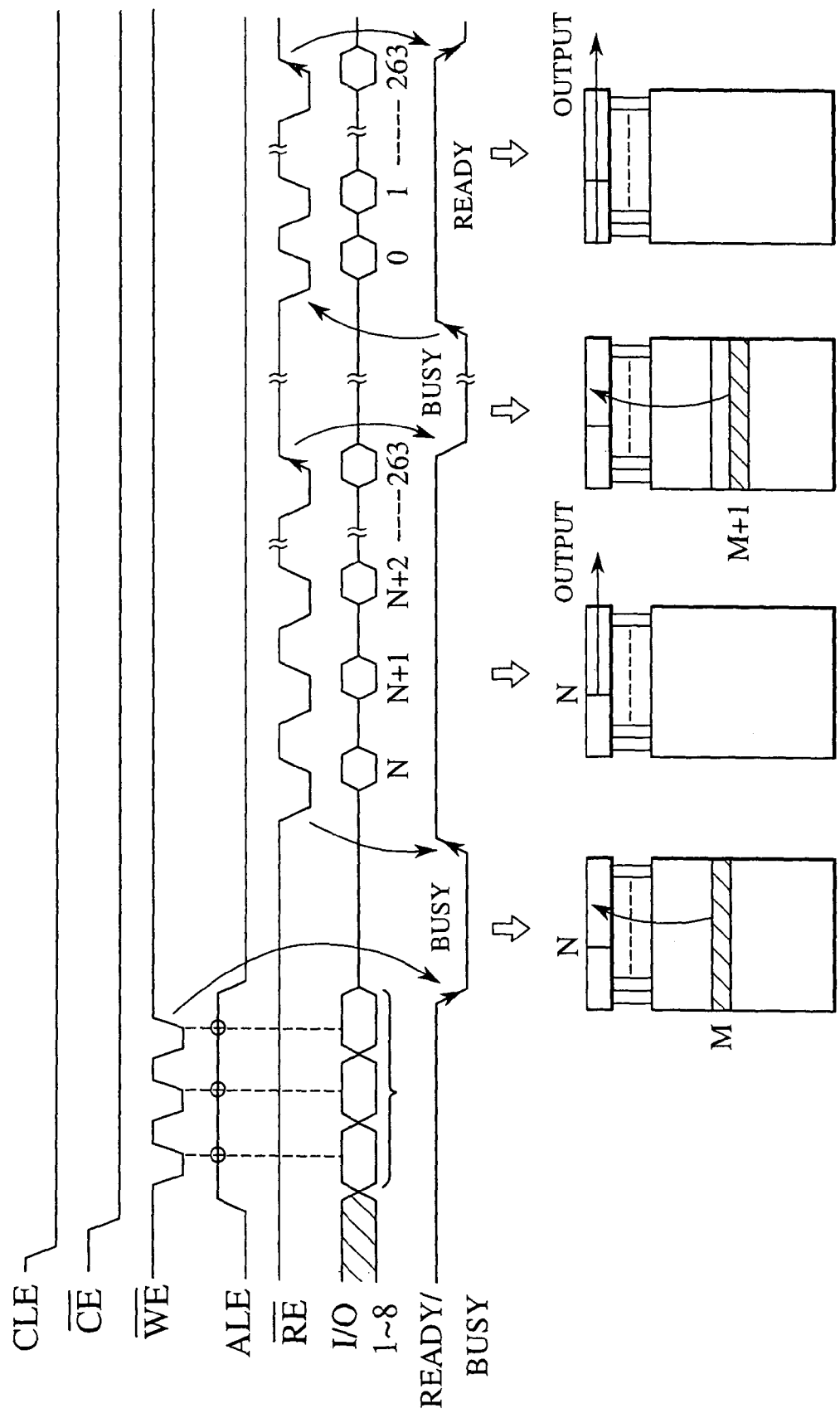
FIG. 38 explains a serial read operation of a memory.

FIG. 38 shows a serial read operation. A page access is started from a first input address. When a page is read, a page access is automatically made to the next page. An external device can determine whether or not a page access is complete according to a potential level at a read/busy terminal.

In addition to the serial page read operation, there is a mode for continuously reading the redundant parts. These read modes are controlled in response to commands. The redundant parts are used to store error correction codes, unique certification data, or an encode key.

Figure 39:
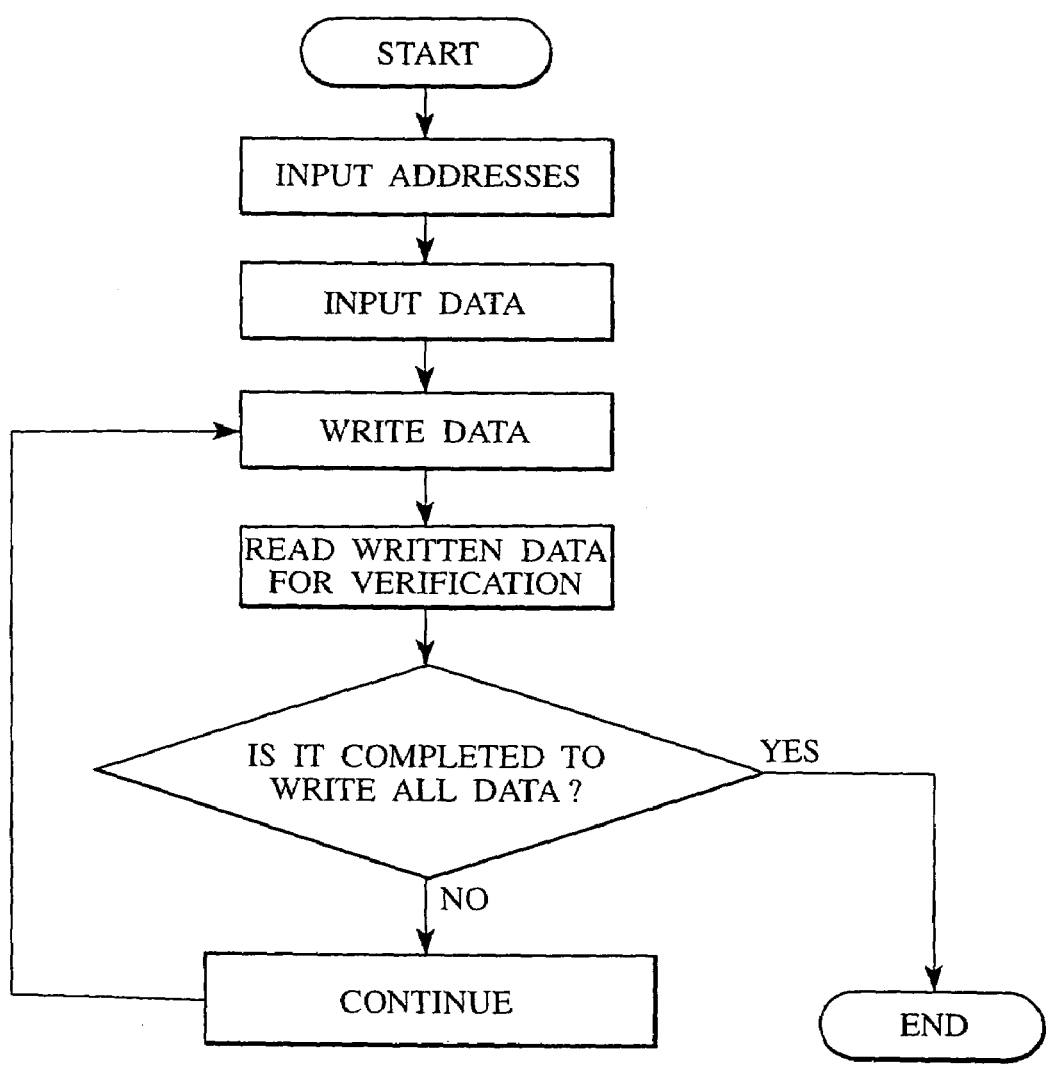
FIG. 39 is a flowchart showing a data write operation on memory cells.

FIG. 39 is a flowchart showing an example of a write operation. This example controls a write time bit by bit to narrow a threshold distribution and secure a sufficient power source margin. First, a write page address is inputted. Write data is inputted and written into the data register for a predetermined period. The written data is automatically read to see if the threshold of a written memory cell is positive. Any bit whose written intensity is insufficient is again written. Any bit whose threshold is positive is never written again.

Figure 40:
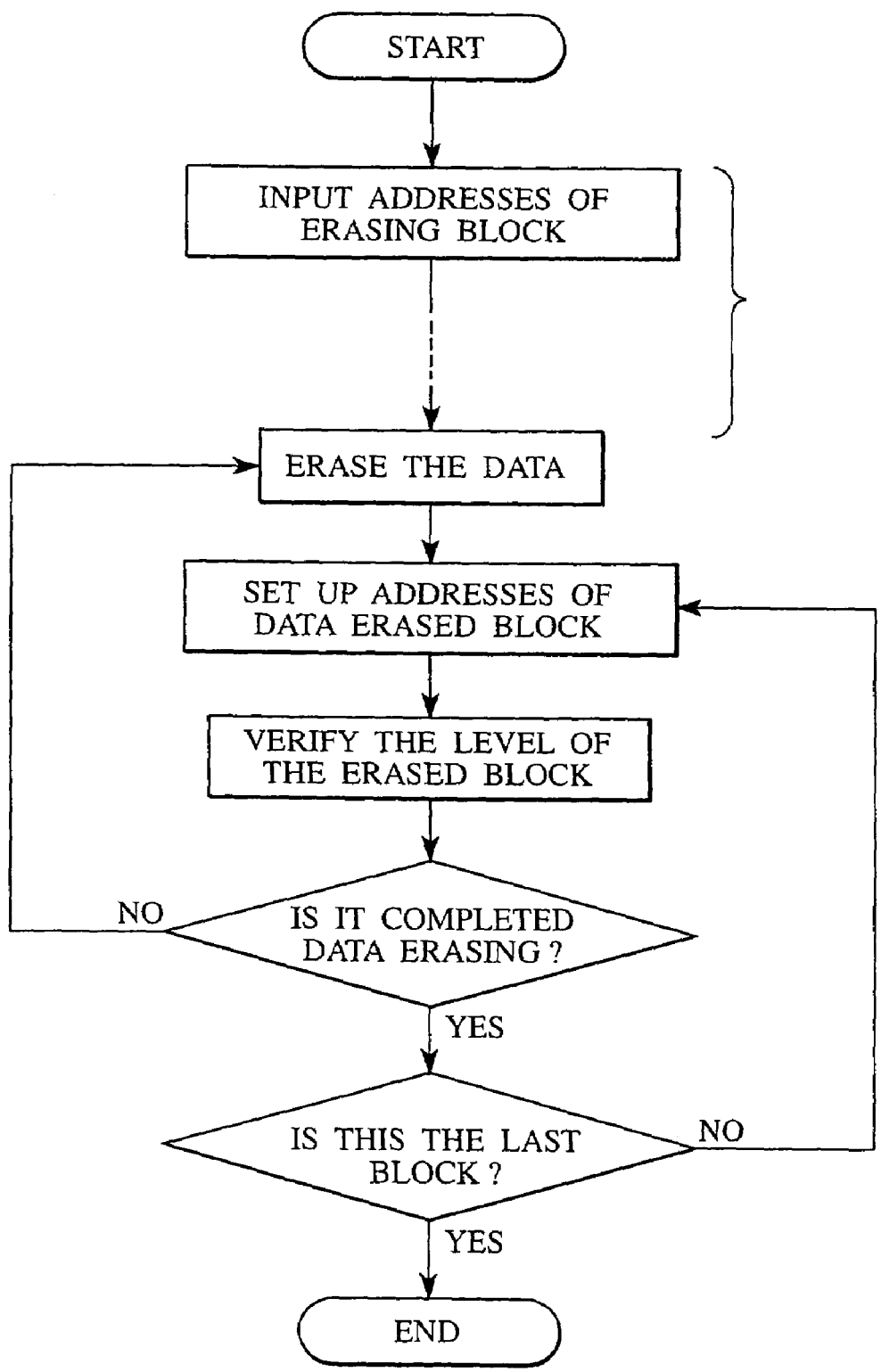
FIG. 40 is a flowchart showing a data erase operation on memory cells.

FIG. 40 is a flowchart showing an erase operation. First, optional block address(es) is inputted and stored in an internal register. A voltage of 0 is applied to the control gate CGi of each memory cell in the block specified by the block address, to erase the memory cells in the block. At this time, an erase voltage is applied to the control gate of each memory cell in unselected blocks, so that only the selected block is erased. After the erasure, the block address is read out of the internal register, to check to see if the threshold of each memory cell in the erased block is sufficiently negative. If the erasure is insufficient, the erase operation is carried out again. This operation is automatically repeated until the blocks to be erased are completely erased.

A multiple-block erasing technique may be employed to erase selected blocks.

Although the explanation has been made for data storage media employing NAND-type flash memories, the present invention is also applicable to data storage media employing NOR- or AND-type flash memories.

Although the data storage media mentioned above are mainly memory cards, they may be smart cards. A smart card can be used as a data processing unit of a data recorder or reader.

Figure 41:
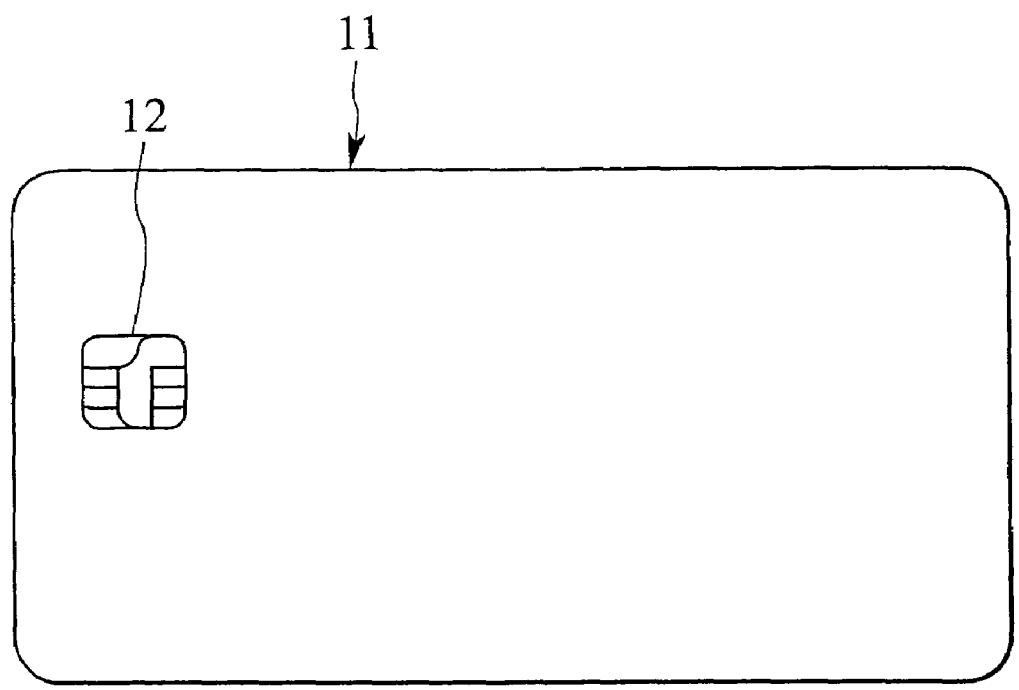
FIG. 41 is a plan view showing a smart card.
Figure 42:
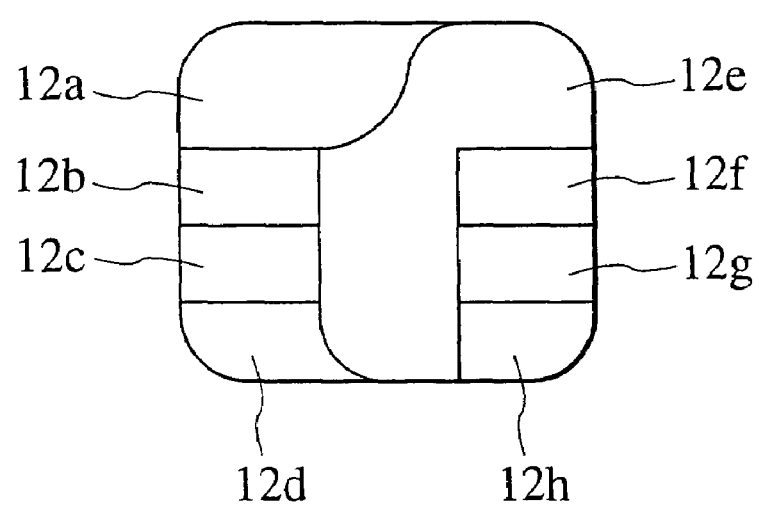
FIG. 42 shows an external terminal of the smart card.

FIG. 41 is a plan view showing a smart card 11. A flat terminal 12 is formed on one surface of the smart card 11. FIG. 42 shows the flat terminal 12. The flat terminal 12 has a power source (Vcc) pin 12a, a reset (RST) pin 12b, a clock (CLK) pin 12c, a ground (GND) pin 12e, and a transfer (I/O) pin 12g. Pins 12d and 12h are spare, and a pin 12f is unused.

Figure 43:
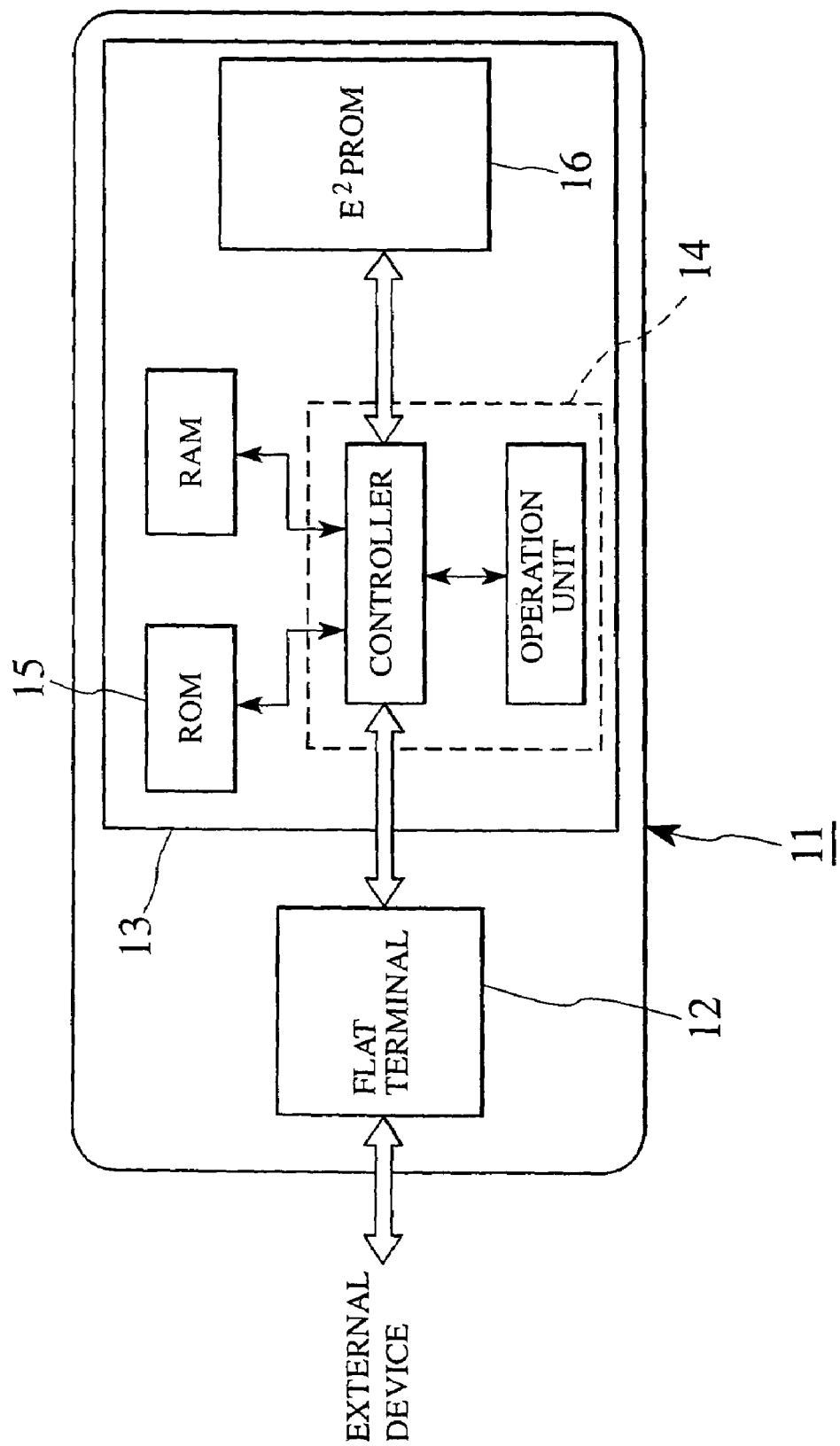
FIG. 43 shows an internal circuit of the smart card.

FIG. 43 shows a circuit in the smart card 11. The circuit includes an MPU (microprocessor unit) chip 13, which consists of a CPU 14, a program memory (ROM) 15, and a data memory (EEPROM) 16. One surface of the smart card 11 is sealed, and the other surface has the flat terminal 12 that is exposed.

As explained above, each data storage medium of the present invention has a specific memory area for storing management data such as certification data unique to the data storage medium, to secure the safety of information in electronic commerce systems, electronic banking systems, electronic money systems, etc.

The data storage media of the present invention are capable of preventing the illegal copying of digital data when applied to systems for distributing data files of music and video through networks such as the Internet.

The data files distributed through networks may include text, music, graphics, video, etc.

Any system that uses the data storage media of the present invention employs an access unit for accessing the semiconductor memory chip 25 (e.g., FIG. 25) through the external terminal 22 (22b) of each data storage media. A host device of the data storage media of the present invention may be a PC, PDA, mobile telephone, digital camera, a portable music device, etc. The host device encodes data to be written into the second memory area 120 (e.g., FIG. 13) of a data storage medium according to certification data stored in the first memory area 110 of the same.

Music data may be distributed in a compressed form based on, for example, AAC, TwinVQ, AC-3, and MP-3. Image data may be compressed based on, for example, JPEG and MPEG2.

In any case, a host device encodes the data according to certification data stored in the first memory area 110 of a given data storage medium of the present invention and records the encoded data in the second memory area 120 of the data storage medium. Even if the data recorded in the second memory area 120 is copied bit by bit to a second data storage medium, the copied data in the second data storage medium is meaningless because the second storage medium has different certification data to decode the copied data.

The data recorders, readers, and data storage media such as smart cards, memory cards of the present invention can be combined in various ways and can be applied to electronic commercial systems, electronic banking systems, electronic money systems, and information distribution systems.

According to the present invention, a memory card that stores encoded identification data may be used for an identification purpose when using a smart card for payment, to further improve security.

The identification data stored in a memory card may be the fingerprint, facial photograph, voiceprint, iris, or a combination thereof of an authorized user of the memory card. The identification data may be encoded into a digital signature and stored in a memory card. Before storing data into a memory card, the external device or an interface to the external device encodes the data according to certification data stored in the first memory area of the memory card.

Two IC cards, i.e., a smart card and a memory card according to the present invention may be used for a system for distributing music and collecting money for the same. Music is distributed to a user through networks, and the user stores the music in a memory card. The billing and payment for the distributed music are carried out with a smart card.

Music, image, and video data are suitable for a serial access, and therefore, the data storage medium having an external terminal and a serial-access memory is suitable for storing such data.

It is preferable to compress music data based on compression algorithms such as AAC, AC-3, and MP-3, to prevent communication congestion and improve communication speed. When recording music data in a memory card, it is compressed to save the space of the memory card. Music data stored in a memory card may be ciphered. Music data to be distributed through networks may be ciphered. The ciphered music data may be stored in data storage media as it is.

Music distribution systems employing the present invention are capable of securely distributing music to users through networks such as the Internet and safely collecting money for the distributed music.

The present invention is applicable not only to music distribution systems but also to systems for distributing text data, image data, video data (MPEG and MPEG2 data), etc.

What is claimed is:

1. A data storage medium comprising:
   a semiconductor memory device having a first memory cell array, a second memory cell array, a first terminal connected to the first memory cell array, and a second terminal connected to the second memory cell array;
   a first wiring, connected to the first terminal, for controlling data write and erase operations of the first memory cell array;
   a second wiring, connected to the second terminal, for controlling a data write operation of the second memory cell array;
   an external terminal connected to the second terminal and electrically separated from the first terminal;
   a support material which supports the semiconductor memory device and the external terminal so that the semiconductor memory device is covered with the support material and the external terminal is exposed from the support material; and
   certification data that is unique to the semiconductor memory device, stored in the first memory cell array.

2. The data storage medium of claim 1, further comprising:
   a circuit which controls a conducting state arranged between the first terminal and the first wiring.

3. The data storage medium of claim 1, further comprising:
   a transistor arranged between the first memory cell array and the first wiring, a gate electrode of the transistor being connected to the first terminal.

4. The data storage medium according to claim 1, wherein
   the first memory cell array is read-only and stores first certification data that is unique to the data storage medium and the second memory cell array stores data and second certification data supplied from the outside; and
   the data storage medium further comprises:
   an identity circuit which determines whether or not the first and second certification data are identical with each other, and the identity circuit including a generator which generates binary data and inverted binary data from the first certification data, and an adder which adds the inverted binary data of the first certification data to binary data corresponding to the second certification data; and a switch circuit which provides the data stored in the second memory cell array to the outside only when the identity circuit determines that the first and second certification data are identical with each other, and the switch circuit including a circuit which connects the second memory cell array to an output terminal only when a sum provided by the adder includes all 1s.

5. The data storage medium of claim 4, wherein the first memory cell array stores binary data and inverted binary data both corresponding to the first certification data.

6. The data storage medium of claim 5, further comprising:

a tester which checks to see if the first certification data was altered; and another switch circuit which provides the data stored in the first memory cell array to the outside only when the tester determines that the first certification data was not altered.

7. The data storage medium of claim 4, wherein the first and the second memory cell arrays are reserved in a NAND-type flash memory.

8. The data storage medium of claim 1, wherein the first memory cell array is read-only and stores first certification data that is unique to the data storage medium, and stores binary data and inverted binary data both corresponding to the first certification data, and the second memory cell array stores data and second certification data supplied from the outside; and the data storage medium further comprises:

an identity circuit which determines whether or not the first and second certification data are identical with each other;

a switch circuit which provides the data stored in the second memory cell array to the outside only when the identity circuit determines that the first and second certification data are identical with each other;

a tester which checks to see if the first certification data was altered and the tester including a reader which reads the binary data and inverted binary data both corresponding to the first certification data from the first memory cell array and an adder which adds the read binary data and inverted binary data to each other; and another switch circuit which provides the data stored in the first memory cell array to the outside only when the tester determines that the first certification data is not altered, and the another switch circuit including a circuit which connects the first memory cell array to an output terminal only when a sum provided by the adder includes all 1s.

9. The data storage medium of claim 1, wherein the first memory cell array is read-only and stores first certification data that is unique to the data storage medium, and the second memory cell array stores data and second certification data supplied from the outside; and the data storage medium further comprises:

an encoder which encodes the first certification data into third certification data;

a specific memory area defined in the second memory cell array according to the first certification data, to store the third certification data;

an identity circuit which determines whether or not the second and third certification data are identical with each other; and the identity circuit including a generator which generates binary data; and a switch circuit which provides the data stored in the second memory cell array to the outside only when the identity circuit determines that the second and third certification data are identical with each other.

10. The data storage medium of claim 9, wherein the first and second memory cell arrays are reserved in a NAND-type flash memory.

11. The data storage medium of claim 9, wherein the identity circuit comprises:

a generator which generates inverted binary data from binary data corresponding to the third certification data; and an adder which adds the inverted binary data of the third certification data to binary data corresponding to the second certification data, and to an output terminal only when a sum provided by the adder includes all 1s.

12. The data storage medium of claim 9, wherein the specific memory area stores binary data both corresponding to the third certification data.

13. The data storage medium of claim 9, further comprising:

a tester which tests to see if the third certification data was altered; and another switch circuit which provides the third certification data to the outside only when the tester determines that the third certification data was not altered.

14. The data storage medium of claim 13, wherein the tester comprises:

a reader which reads the binary data and inverted binary data both corresponding to the third certification data from the specific memory area; and an adder which adds the read binary data and inverted binary data to each other, and wherein the switch circuit comprises:

a circuit which connects the specific memory area to an output terminal only when a sum provided by adder includes all 1s.

15. The data storage medium of claim 1, the first memory cell array and the second memory cell array are formed in one semiconductor chip.

16. The data storage medium of claim 15, the first wiring and the second wiring are arranged outside of the semiconductor chip.

17. A data storage medium comprising:

a wiring board having first and second faces;

a semiconductor memory device mounted on the first face of the wiring board, having a first memory cell array, a second memory cell array, a first terminal connected to the first memory cell array, and a second terminal connected to the second memory cell array;

a first wiring, connected to the first terminal, for controlling data write and erase operations of the first memory cell array;

a second wiring, connected to the second terminal, for controlling a data write operation of the second memory cell array;

an external terminal arranged on the second face of wiring board, connected to the second terminal, and electrically separated from the first terminal;

a resin seal for covering the first face of the wiring board and the semiconductor memory device; and certification data that is unique to the semiconductor memory device, stored in the first memory cell array.

18. The data storage medium of claim 17, further comprising:

a module which integrates the semiconductor memory device, external terminal, and resin seal into one; and
a card-type support which supports the module.

19. The data storage medium of claim 17, wherein
the first memory cell array is read-only and stores first certification data that is unique to the data storage medium, and the second memory cell array stores data and second certification data supplied from the outside; and
the data storage medium further comprises:
an identity circuit which determines whether or not the first and second certification data are identical with each other, and the identity circuit including a generator which generates binary data and inverted binary data from the first certification data, and an adder which adds the inverted binary data of the first certification data to binary data corresponding to the second certification data; and
a switch circuit which provides the data stored in the second memory cell array to the outside only when the identity circuit determines that the first and second certification data are identical with each other, and the switch circuit including a circuit which connects the second memory cell array to an output terminal only when a sum provided by the adder includes all 1s.

20. The data storage medium of claim 19, wherein the first memory cell array stores binary data and inverted binary data both corresponding to the first certification data.

21. The data storage medium of claim 20, further comprising:
a tester which checks to see if the first certification data was altered; and
another switch circuit which provides the data stored in the first memory cell array to the outside only when the tester determines that the first certification data was not altered.

22. The data storage medium of claim 19, wherein the first and the second memory cell arrays are reserved in a NAND-type flash memory.

23. The data storage medium of claim 17, wherein
the first memory cell array is read-only and stores first certification data that is unique to the data storage medium, and stores binary data and inverted binary data both corresponding to the first certification data, and the second memory cell array stores data and second certification data supplied from the outside; and
the data storage medium further comprises:
an identity circuit which determines whether or not the first and second certification data are identical with each other;
a switch circuit which provides the data stored in the second memory cell array to the outside only when the identity circuit determines that the first and second certification data are identical with each other;
a tester which checks to see if the first certification data was altered, and the tester including a reader which reads the binary data and inverted binary data both corresponding to the first certification data from the first memory cell array and an adder which adds the read binary data and inverted binary data to each other; and
another switch circuit which provides the data stored in the first memory cell array to the outside only when the tester determines that the first certification data is not altered, and the another switch circuit including a circuit which connects the first memory cell array to an output terminal only when a sum provided by the adder includes all 1s.

24. The data storage medium of claim 23, wherein
the first memory cell array is read-only and stores first certification data that is unique to the data storage medium, and the second memory cell array stores data and second certification data supplied from the outside; and
the data storage medium further comprises:
an encoder which encodes the first certification data into third certification data;
a specific memory area defined in the second memory cell array according to the first certification data, to store the third certification data;
an identity circuit which determines whether or not the second and third certification data are identical with each other; and
a switch circuit which provides the data stored in the second memory cell array to the outside only when the identity circuit determines that the second and third certification data are identical with each other.

25. The data storage medium of claim 24, wherein the first and second memory cell arrays are reserved in a NAND-type flash memory.

26. The data storage medium of claim 24, wherein the identity circuit comprises:
a generator which generates inverted binary data from binary data corresponding to the third certification data; and
an adder which adds the inverted binary data of the third certification data to binary data corresponding to the second certification data, and wherein the switch circuit comprises:
a circuit which connects the second memory cell array to an output terminal only when a sum provided by the adder includes all 1s.

27. The data storage medium of claim 24, wherein the specific memory area stores binary data and inverted binary data both corresponding to the third certification data.

28. The data storage medium of claim 24, further comprising:
a tester which tests to see if the third certification data was altered; and
another switch circuit which provides the third certification data to the outside only when the tester determines that the first certification data was not altered.

29. The data storage medium of claim 28, wherein the tester comprises:
a reader which reads the binary data and inverted binary data both corresponding to the third certification data from the specific memory area; and
an adder which adds the read binary data and inverted binary data to each other, and wherein the switch circuit comprises:
a circuit which connects the specific memory area to an output terminal only when a sum provided by adder includes all 1s.

30. The data storage medium of claim 17, the first memory cell array and the second memory cell array are formed in one semiconductor chip.

31. The data storage medium of claim 30, the first wiring and the second wiring are arranged outside of the semiconductor chip.

* * * * *